United States Patent

[11] 3,597,598

[72] Inventors Donald F. McAllister
Rolling Hills;
Frank M. Pelteson, Santa Ana, both of, Calif.
[21] Appl. No. 417,905
[22] Filed Dec. 14, 1964
[45] Patented Aug. 3, 1971
[73] Assignee North American Rockwell Corporation

[54] METHOD AND MEANS FOR TRANSFORMING THE ACCELERATION SIGNALS GENERATED BY ACCELEROMETERS IN A FIRST COORDINATE SYSTEM INTO ACCELERATION SIGNALS IN A SECOND COORDINATE SYSTEM
4 Claims, 13 Drawing Figs.

[52] U.S. Cl. ..................................................235/150.25, 73/178, 74/5.34, 33/226
[51] Int. Cl. ..................................................G06f 15/50, G06g 7/78
[50] Field of Search........................................235/150 25-−150.272; 74/5.34; 73/178; 33/226 Z

[56] References Cited
UNITED STATES PATENTS

| | | | |
|---|---|---|---|
| 2,955,474 | 10/1960 | Sutherland .................. | 74/5.34 |
| 3,078,042 | 2/1963 | Grado .......................... | 235/150.27 |
| 3,127,774 | 4/1964 | Fischer et al. ................ | 73/504 |
| 3,131,292 | 4/1964 | Tobin............................ | 235/151 |
| 3,222,795 | 12/1965 | Gevas............................ | 33/226 |
| 3,231,726 | 1/1966 | Williamson.................. | 235/150.25 X |
| 3,201,793 | 8/1965 | Pasquier et al. .............. | 235/150.27 |
| 3,269,024 | 8/1966 | Fischer et al. ................ | 33/226 |
| 3,331,951 | 7/1967 | Webb (Lee et al.)........ | 235/150.25 |
| 3,342,982 | 9/1967 | Manoni........................ | 235/150.25 |
| 3,442,140 | 5/1969 | Pelteson...................... | 235/150.25 |

Primary Examiner—Malcolm A. Morrison
Assistant Examiner—Charles E. Atkinson
Attorney—L. Lee Humphries ABSTRACT: A method and means for transforming the acceleration signals generated by orthogonally disposed accelerometers mounted upon an untorqued inertial gyro platform into acceleration signals which are useful in another coordinate system, for example, an earth base latitude and longitude coordinate system.

INVENTORS
DONALD F. McALLISTER
FRANK M. PELTESON

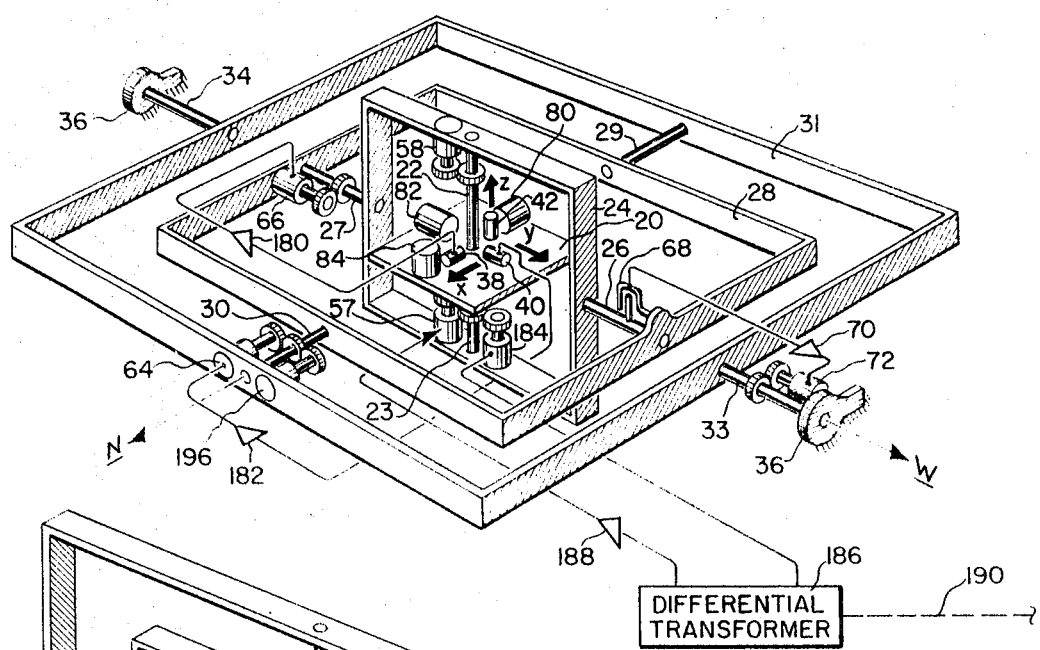
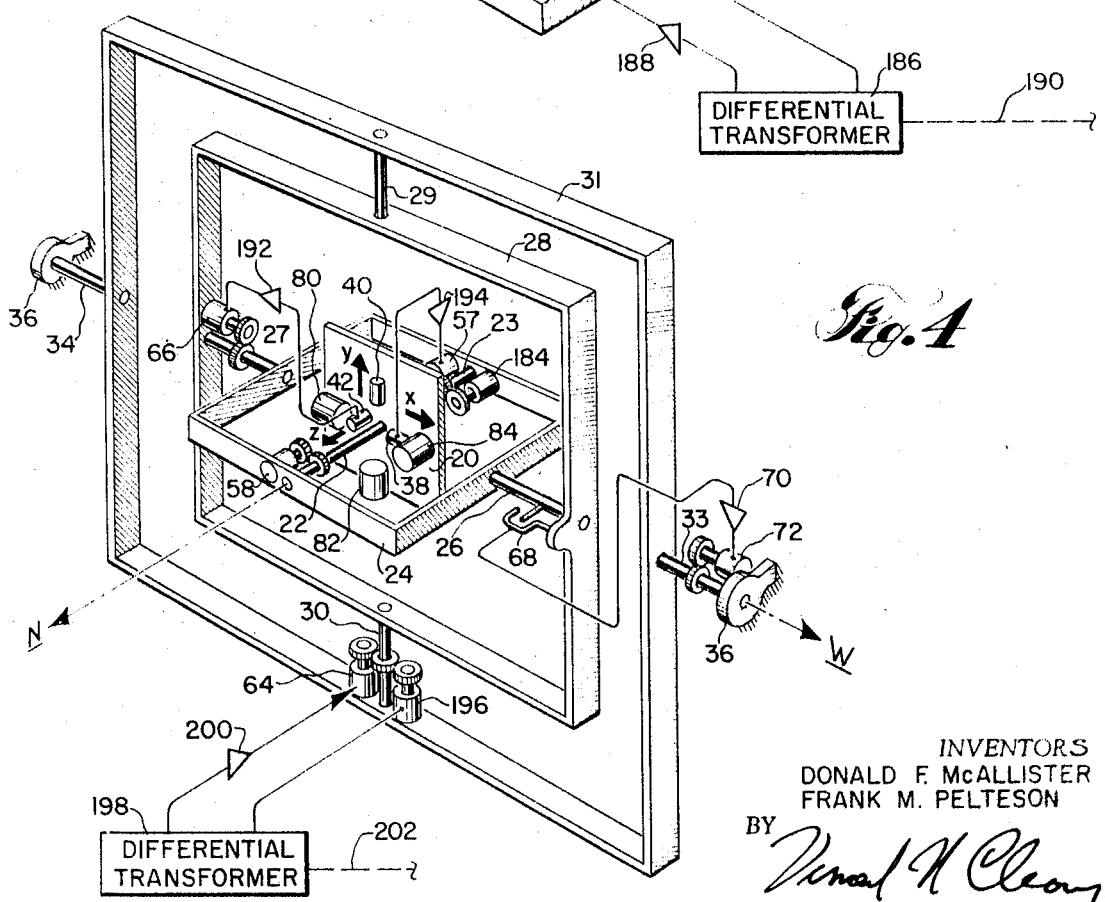

INVENTORS
DONALD F. McALLISTER
FRANK M. PELTESON

BY

ATTORNEY

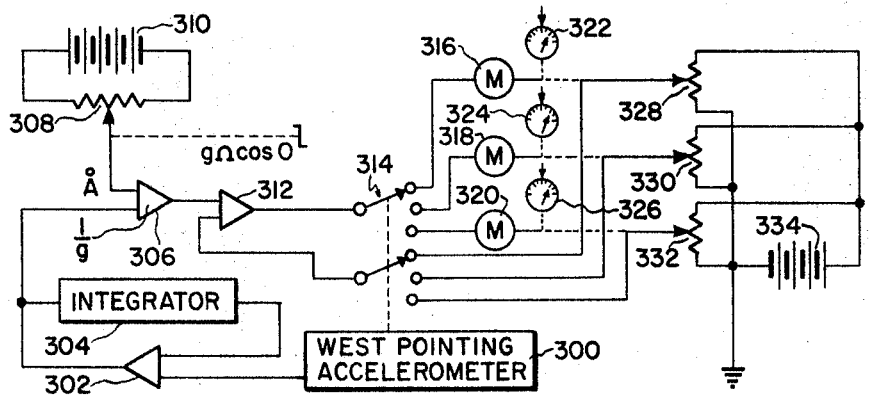
Fig. 7
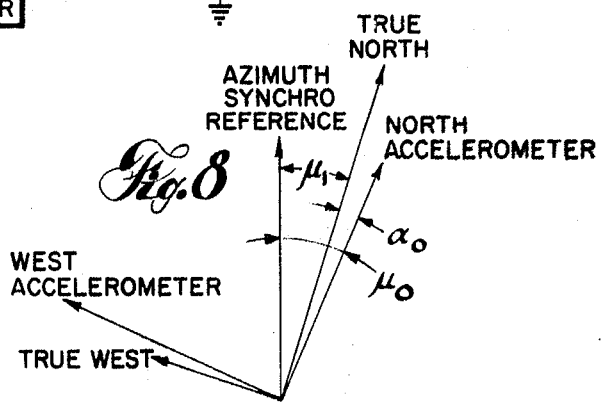
Fig. 8
Fig. 9

METHOD AND MEANS FOR TRANSFORMING THE ACCELERATION SIGNALS GENERATED BY ACCELEROMETERS IN A FIRST COORDINATE SYSTEM INTO ACCELERATION SIGNALS IN A SECOND COORDINATE SYSTEM

This invention pertains to a method and means for angularly transforming acceleration signals measured in a first coordinate system into signals which are measures of acceleration in the directions of the components of a second coordinate system.

The principal distinction between an untorqued inertial navigation system mechanization and a torqued system mechanization, where it is understood that the term "torquing" implies the control of the spatial rotation of the gyro platform by precisely computed, electromechanically produced, precessional torques, is that the untorqued platform rotates independently of any computed navigational quantities. In particular, the untorqued platform is conceived to rotate at a constant and known angular velocity relative to inertial space.

Because the untorqued inertial navigation system used untorqued gyros, the platform will precess ideally at some fixed vector angular rate in inertial space. If this vector angular rate is observed either in platform coordinates or in inertial coordinates, it will (except for random variations) appear to be of constant magnitude about an axis of constant direction. In other words, each gyro contributes a fixed angular rate component to the total vector angular rate of the platform. The value of the fixed component of angular rate that each gyro contributes to the total angular rate is inherent with each gyro and presupposes a fixed instrument torque in the gyro.

Because the platform is not controlled by the navigational computer, and navigational computations need to be made using the accelerometers of the freely precessing platform, it is necessary to include in the computer a method of resolving the platform's accelerometer outputs into the earth-fixed navigational coordinates. One may think of this resolving process as one in which the computer is provided with a coordinate system that imitates the inertial angular motion of the platform, and a second coordinate system that imitates the inertial angular motion of the earth. Multiplying the three accelerometer signals by the continually changing direction cosines between the two coordinate systems resolves the accelerometer outputs into navigational coordinates.

The torqued platform, by virtue of its controlled rotation along the axes of the navigational frame of reference, needs no transformation of the accelerometer outputs. In contrast, the untorqued platform requires that the navigation computer continuously calculate the direction cosines that represent the paralleled projection of the platform axes on the navigational axes, and that it project the accelerometer output vector along the navigational axes by linearly combining the three accelerometer outputs with the said direction cosines.

The method and means of obtaining transformation information comprehends the fundamental principle that the local gravity vector is rotating at the earth rate in inertial space when the platform is located at an earth-fixed station. The accelerometers will display this phenomenon in the unknown platform coordinates and will provide sufficient information over a period of elapsed time to enable the computer to calculate the unknown direction numbers of the platform axes relative to the navigational frame. Once this calculation has been accomplished, the function generation of the direction cosines can proceed, since the now known direction cosines have been furnished with initial values.

The untorqued inertial navigation system has the innate feature of eliminating platform-mounted mirrors and bubble levels, since preflight alignment is made in relation to the physical sensing axes of the accelerometers only. A second feature is that the gyro input axis mounting alignment requirement is reduced to one of guaranteeing stability only, since gyro torquing and the accompanying attention to torquing axis mounting alignment is not necessary.

The inertial reference device which supports the acceleration sensing instruments is a platform or frame which has a first Cartesian set of coordinates fixed thereon. The Cartesian coordinate system which is fixed relative to the supporting platform is described herein with a right-handed set of coordinates although obviously a left-handed set could be used with appropriate changes in order and sign of the parameters of the equations to be described. The invention will be described herein with a right-handed set of coordinates. The platform carries three acceleration sensing members whose sensing axes are coaxial with the axes of the above-mentioned Cartesian set of coordinates.

The inertial reference device mentioned above is adapted to be carried on a vehicle which has a second Cartesian set of coordinates defined and fixed thereon, designated in accordance with the known art as the roll, pitch, and yaw axes of the vehicle. The second Cartesian set of coordinates is also preferably a right-handed system. The inertial reference device, platform, or frame is preferably gimbaled relative to its supporting vehicle.

The gimbal supported platform has fixed thereto angular reference means such as gyroscopes or vibrating strings. In the preferred embodiment, vibrating string angular reference means such as that described in U.S. Pat. No. 3,106,847, entitled "Gyroscopic Apparatus," by William D. Mullins, Jr., et al., and Pat. application Ser. No. 96,611, entitled "Stable Reference Apparatus," filed Mar. 17, 1961 and now Pat. No. 3,198,019 issued Aug. 3, 1965 by William D. Mullins, Jr., et al., are preferably used. The vibrating strings or gyroscopes are untorqued which simplifies their structure. The drift of the inertial angular reference means relative to the platform is sensed and the resulting signal is used to drive appropriate motors on the gimbal axes to cause the platform to follow the inertial angular reference means.

The state of the gyroscope and vibrating string art has progressed to the point where untorqued gyroscopes and vibrating strings have a substantially constant angular drift rate. Since the supporting platform is servoed to the inertial angular reference means (one inertial angular reference means controlling the platform about each axis of the Cartesian set of axes positioned on the platform), the platform rotates at a substantially constant angular rate, equal to the drift rate of each of the angular reference means, about an axis which is fixed on the platform and fixed relative to the stars. The axis of rotation of the platform usually does not coincide with any of the axes of the Cartesian set of coordinates which is fixed on the platform.

To determine the direction cosines between the axis of angular drift of the platform and the principal axes of the Cartesian set of coordinates affixed to the platform, a calibrating procedure such as that described in U.S. Pat. No. 3,127,774, entitled "Means and Method for Determining the Direction of the Axis of Rotation of a Controllably Rotating Platform," by John J. Fischer, et al., assigned to North American Aviation, Inc., the assignee of this application, must be used. That patent describes a means for determining the components of the angular velocity of drift of the platform in terms of the Cartesian set of coordinates fixed upon the platform.

This invention is concerned with a method and means for transforming the signals generated by the accelerometers upon the freely rotating platform into acceleration signals which are useful in another coordinate system, for example, an earth based latitude and longitude coordinates system. Other useful coordinate systems are known and may be used, for example, a cylindrical coordinate system in which a guidance plane is perpendicular to the axis of the cylindrical coordinate system.

Assuming that the platform rotates at a constant angular velocity about an axis which is fixed relative to inertial space, the acceleration sensed by the accelerometers affixed to the platform may be referred to a Cartesian set of coordinates which are angularly fixed relative to inertial space to coincide with the set of coordinates upon the platform once each revolution of the platform. The rotating set of coordinates coincides with the fixed set of coordinates at some initial time which may be designated as time $t=0$.

A third set of Cartesian coordinates may be positioned to rotate with the earth, with one of the principal axes parallel to the axis of rotation of the earth and the other two principal axes parallel to an equatorial plane of the earth. The last-named Cartesian set of coordinates rotates with the earth about the coordinate which is parallel to the earth's axis of rotation with an angular velocity equal to $\omega$. At time $t=0$ the last name rotating coordinate system has a specific angular position relative to the stars. A fourth Cartesian set of coordinates may be defined parallel to the third set, fixed relative to the stars, and coinciding with the third set at time $t=0$.

If a rotation matrix can be found which specifies the angular relation between the two Cartesian coordinate systems which are fixed relative to the stars, i.e., the position of the coordinate system which rotates with the platform and the position of the coordinate system which rotates with the earth at time $t=0$, the relation between the direction of the rotating axes of the platform relative to the direction of the rotating axes of the Cartesian coordinate system which is fixed relative to the earth is uniquely defined. Consequently, the acceleration measured by the accelerometers which have their sensing axes aligned with the axes of the platform rotating coordinate system may be rotated by a series of orthogonal rotation matrices into the earth rotating coordinate system.

It is a major object of this invention to rotate the acceleration signals sensed in the direction of the principal axes of a platform rotating coordinate system into another predetermined coordinate system.

It is a more particular object of this invention to rotate acceleration signals which are representative of acceleration in the direction of the principal axes of a rotating coordinate system into a set of signals which are representative of the acceleration relative to a Cartesian set of earth rotating coordinates.

It is a further object of this invention to resolve acceleration signals in a first Cartesian coordinate system which is rotating in a known fashion relative to the stars into a second Cartesian coordinate system which is rotating in a second known manner relative to the stars, an irrotational Cartesian coordinate system being a specific member of the sense of coordinate systems which are rotating in a predetermined manner relative to the stars.

It is a more specific object of this invention to provide a method for achieving the above named objects.

These and other objects will become apparent from the following description taken in connection with the accompanying drawings in which:

FIG. 3 is a view of the platform of FIG. 1, orientated relative to a north-east-south-west earth coordinate system for a first step in obtaining the magnitude and direction of the angular velocity of drift of the platform;

FIG. 4 is a view of the platform of FIG. 1, orientated relative to a north-east-south-west earth coordinate system for a second step in obtaining the direction and magnitude of the angular velocity of drift of the platform;

FIG. 7 is a schematic diagram of a second analog computation network used to obtain the magnitude and direction of the angular velocity of drift of the platform relative to a Cartesian set of coordinates which are fixed on the platform;

FIG. 8 is a diagram showing the angular relations between directions during the process of obtaining the components of angular velocity of drift of the platform in the Cartesian coordinate system which is fixed on the platform;

FIG. 9 is a diagram showing the geometrical relation between the various vectors imposed on the earth sphere;

Figure 1:
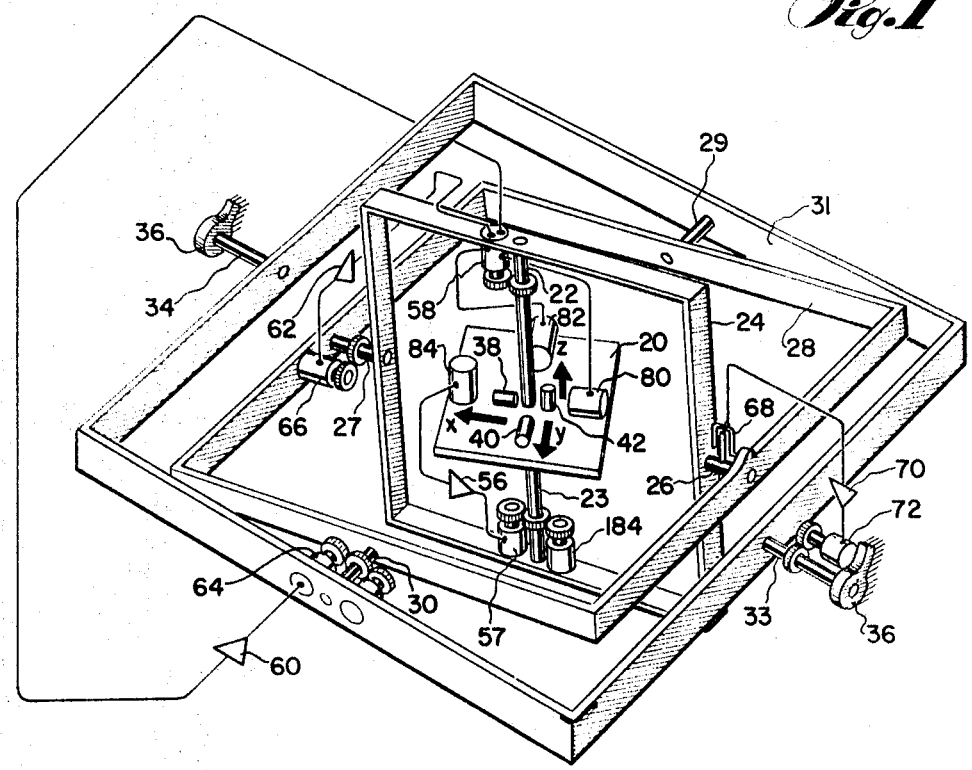
FIG. 1 is a typical embodiment of a rotatable platform which is used with this invention.

In FIGS. 1, 3, 4 and 5 a rotatable gimbaled platform 20 is supported for rotation about a first axis, denoted the z axis, upon coaxial shafts 22 and 23. Shafts 22 and 23 are mounted for rotation relative to gimbal 24 upon bearings (not shown). Gimbal 24 is mounted for rotation, relative to gimbal 28, upon coaxial shafts 26 and 27 whose common axis is perpendicular to the axis of shafts 22 and 23. Gimbal 28 is mounted for rotation, relative to gimbal 31, upon coaxial shafts 29 and 30, whose common axis is perpendicular to the axis of shafts 26 and 27. Gimbal 31 is mounted for rotation, relative to a supporting vehicle 36, upon coaxial shafts 33 and 34 whose common axes is perpendicular to the axis of shafts 29 and 30.

Three accelerometers 38, 40, and 42 are affixed to platform 20 with their sensitive axes forming a Cartesian set of coordinates, $x$, $y$, and $z$, respectively. The set of coordinates $x$, $y$, and $z$ are shown as a right-handed set of coordinates and are preferably so, although a left-handed set of coordinates could be substituted with changes in the mechanization which would be obvious to persons skilled in the art. A right-handed set of coordinates will be used for the description herein. The platform coordinates $x$, $y$, and $z$ will be called herein the platform coordinates. Alternatively, two-axes accelerometers could replace the three accelerometers 38, 40, and 42.

Three single axis inertial angular errors sensors 80, 82, and 84 such as single degree of freedom gyroscopes or vibrating strings are positioned upon platform 20 to sense platform angular rotation about the $x$, $y$, and $z$ axes, respectively. The $z$ axis output of inertial angular reference means 84 is connected through amplifier 56 to motor 57 to drive platform 20 relative to gimbal 24 in a direction to return to zero the $z$ axis output signal of angular reference means 84. The $x$ and $y$ axes outputs of inertial angular reference means 80 and 82 are connected through resolver 58 and amplifiers 60 and 62 to motors 64 and 66 to drive gimbals 28 and 24 in directions to return to zero the output signals of inertial angular reference means 80 and 82. Pickoff means 68 is connected through amplifier 70 to motor 72 to drive gimbal 31, relative to the supporting means 36, in a direction to return to zero the output signal of pickoff means 68.

Alternatively, for example, two axes gyroscopes such as the Free-Rotor Gyroscope shown and described in Pat. application Ser. No. 641,720, entitled "Free-Rotor Gyroscope," filed Feb. 21, 1957, and now U.S. Pat. No. 3,394,395 issued July 30, 1968 by D. B. Duncan, et al., could be used in place of the inertial reference means 80, 82, and 84.

The devices 80, 82, and 84 may be, for example, single axis angle sensing devices of the type shown in the previously mentioned U.S. Pat. No. 3,106,847 and the previously mentioned application Ser. No. 96,611.

Figure 2:
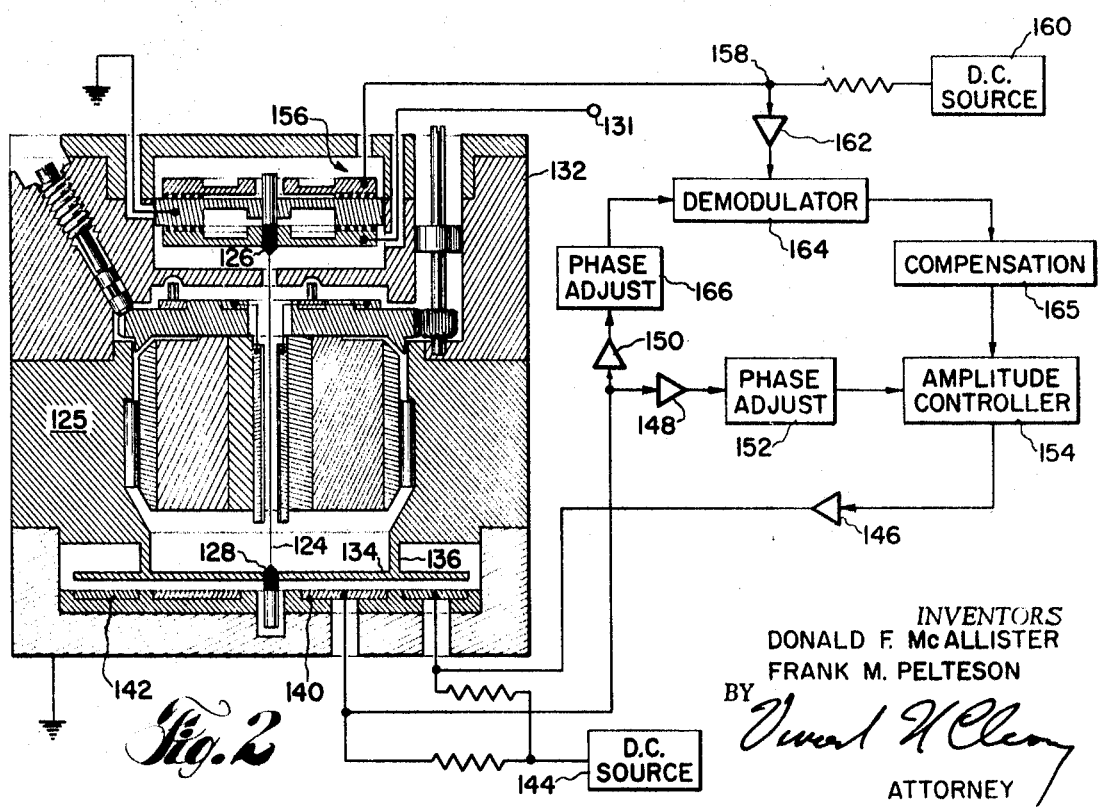
FIG. 2 is a view, partially in section, of a typical vibrating reference device whose drift may be used to control the angular orientation of the rotating platform.

A typical vibrating string in an inertial angular reference element of the kind shown and described in U.S. Pat. No. 3,106,847 and patent application Ser. No. 96,611 now U.S. Pat. No. 3,198,019 issued Aug. 3, 1965, is shown in FIG. 2.

Vibrating string 124 comprises a quartz fiber having enlarged integral end portions 126 and 128, and a metallic coating, such as gold or chromium, to cause the string to be conductive. A driving disc 134 is secured to the housing 132 along an annular area at a vibration node of the disc by means of an annular support sleeve 136, which is integral with disc 134 and with support member 138 which forms a fixed part of the housing 132. Enlarged portion 128 of string 124 is secured by cement to a closely fitting aperture located at the center of the drive disc 134.

Disc 134, fabricated, for example, of metal or quartz, is driven, preferably at its resonant frequency, by an electrostatic drive. If made of quartz, disc 134 has a conductive coating on its under surface to form a capacitance with its electrodes 140 and 142.

Electrode 142 is connected to a direct current bias source 144 and to the output of driving amplifier 146. The deflection of diaphragm 134 is detected by capacity pickoff electrode 140. The voltage variation on electrode 140, caused by oscillation of diaphragm 134, is coupled to the inputs of amplifiers 148 and 150. The signal at the output of amplifier 148 is connected through a phase adjuster 152 and an amplitude controller 154 (for example, a variable gain amplifier) to the input of driving amplifier 146. The phase adjuster 156 is adjusted to obtain maximum oscillation of disc 134. Amplitude controller 154 is used to control the amplitude of the driving force on disc 134 to stabilize the drift of the plane of oscillation of string 124.

It is desirable to maintain the tension in string 124 at a predetermined value to stabilize to a substantially constant value the angular drift of the plane of oscillation of string 124. A capacitive means 156 senses the tension in string 124 and generates a signal at junction point 158, which is a measure of the tension. Direct current source 160 is connected to electrically bias the tension measuring mechanism 156. The signal from junction point 158 is connected through amplifier 162 to control a demodulator 164. Demodulator 164 receives a signal from pickoff electrode 140 through amplifier 150 and phase adjuster 166. The phase adjuster 166 is adjusted to cause the voltage at the output of demodulator 164 to be of the proper sense to be connected through a compensation network 165 to control the amplitude of the signal at the output of amplitude controller 154, thereby limiting the magnitude of the signal driving disc 134. The output of demodulator 164 is positive if the voltage at the output of amplifier 162 is in phase with the output of phase adjuster 166 and negative if the voltage at the output of amplifier 162 is opposite in phase from the output of phase adjuster 166. To introduce compensation into the servoloop, a compensation network 165 is connected between demodulator 164 and amplitude controller 154.

String 124 oscillates in a plane within a magnetic field which generates a voltage between the two ends of string 124. When the string vibrates perpendicular to the magnetic field, a particular voltage is induced. When the string vibrates parallel to the magnetic field, a zero voltage is induced. When the string 124 vibrates at some angle relative to the magnetic field, a voltage is induced between the two ends of string 124 which is a measure of the angle which the plane of vibration of the string makes in the magnetic field. Thus, the voltage between frame 132 and terminal 131 is also a measure of the rotation of housing 138 relative to the plane of vibration of string 124.

Even if it is not desirable to cause the drift of the instrument to be zero, it is desirable to know what the drift of the instrument is and to know that the drift remains constant. To this end, the control circuit which is shown in FIG. 2 can be used.

In FIG. 2, three vibrating string devices, such as that shown in FIG. 2, are oriented with the axes of their vibrating strings parallel to the platform axes, $x$, $y$, and $z$, respectively. Hence, the platform 20 follows the angularly drifting planes of vibration of the instruments 80, 82, and 84. Platform 20 has imparted to it an angular velocity that is the vector sum of the drift angular velocity vectors of the individual planes of vibration of vibrating string instruments 80, 82, and 84.

In the device shown in FIG. 1, as shafts 26 and 27 rotate, pickoff 68 detects the rotation and causes motor 72 by means of amplifier 70 to rotate shafts 33 and 34 to cause the planes of gimbals 24 and 28 to remain substantially perpendicular to each other to prevent gimbal lock.

To implement the device of this invention, it is necessary to know the magnitude and direction of the angular velocity of drift of platform 20 relative to the platform coordinates $x$, $y$, and $z$.

METHOD FOR DETERMINING THE MAGNITUDE AND DIRECTION OF

THE AXIS OF ROTATION OF THE ROTATING PLATFORM 20

IN PLATFORM COORDINATES X, Y, AND Z

Figure 5:
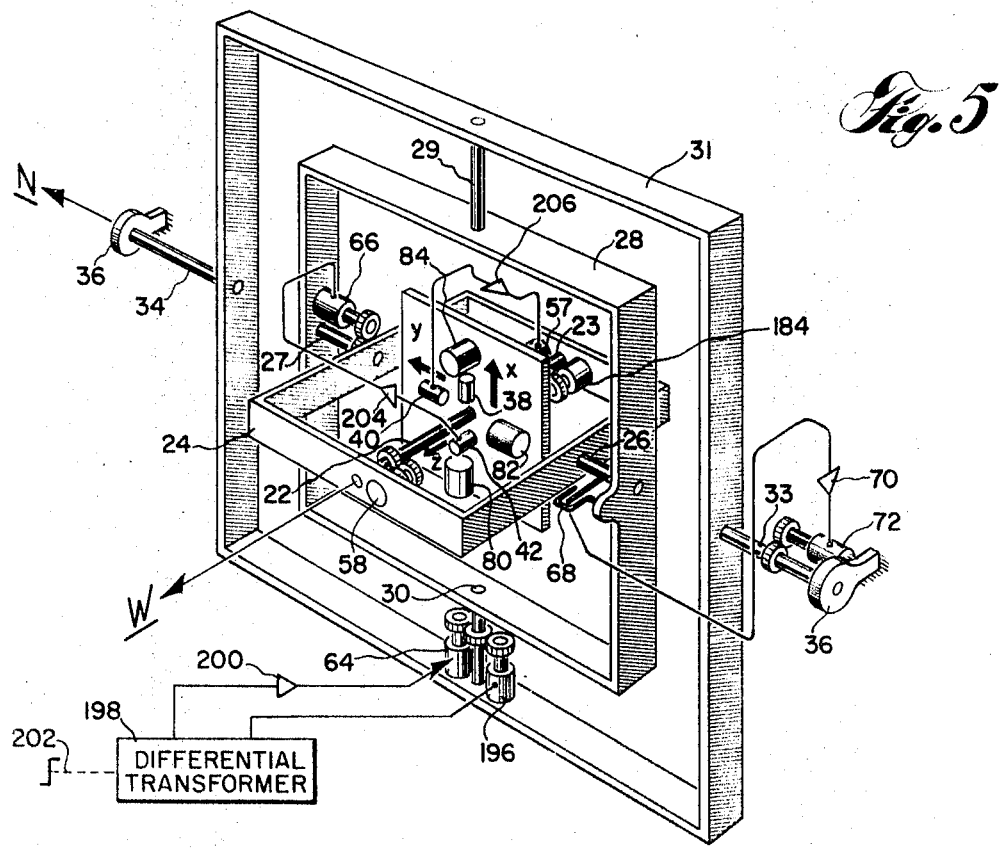
FIG. 5 is a view of the platform of FIG. 1, orientated relative to a north-east-south-west earth coordinate system for a third step in obtaining the magnitude and direction of the angular velocity of drift of the platform relative to a Cartesian coordinate system fixed on the platform.

FIGS. 3, 4, and 5 show the platform 20 position in three consecutive starting positions in one preferred sequence of orientations preparatory to determining the direction of the axis of angular velocity of drift and the magnitude of the angular velocity of drift or platform 20 in platform coordinates $x$, $y$, and $z$. In each of FIGS. 3, 4, and 5 the gimbal position is controlled by two of the three accelerometers 38, 40, and 42 which causes the sensing axes of the two controlling accelerometers to be positioned in a locally horizontal plane, in which event the controlling accelerometer outputs go to zero.

In FIG. 3, the output of accelerometer 38 is connected through amplifier 180 to control motor 66 to cause the signal to return to zero at the output of accelerometer 38. Accelerometer 40 is connected through amplifier 182 to motor 64 to control the position of gimbal 28 to return to zero the signal at the output of accelerometer 40. A pickoff 184, such as a synchro, is connected to detect the angle of the shaft 23 relative to gimbal 24. The output of synchro 184 is connected through a differential transformer 186 and an amplifier 188 to control the position of motor 57 and shaft 23 in response to the command input 190 of synchro differential transformer 186. Synchro differential transformer shaft input 190 is adjusted to cause the sensing, or axis of accelerometer 38, to point substantially north and the sensing, or $y$ axis of accelerometer 40 to point substantially west.

In FIG. 4, the output of accelerometer 42 is connected through amplifier 192 to motor 66 to control the position of gimbal 24 to cause the signal to return to zero at the output of accelerometer 42. The output of accelerometer 38 is connected through amplifier 194 to motor 57 to position platform 20 to return to zero the output signal from accelerometer 38. A pickoff device 196, such as a synchro, is connected by its output through the synchro differential transformer 198 and amplifier 200 to motor 64. Synchro 196 generates a signal which is a measure of the position of shaft 30 relative to gimbal 31. The shaft command input 202 at differential transformer 198 is set to cause the sensing, or $x$ axis of accelerometer 38 to point substantially west and the sensing, or $z$ axis of accelerometer 42 to points substantially north.

In FIG. 5, the output of accelerometer 42 is connected through amplifier 204 to motor 66 to cause the signal to return to zero at the output of accelerometer 42. The output of accelerometer 40 is connected through amplifier 206 to motor 57 to cause the signal to return to zero at the output of accelerometer 40. The output of synchro 196 is connected through synchro differential transformer 198 and amplifier 200 to motor 64. The command input 202 to differential transformer 198 is set so that motor 64 causes the sensing, or $y$ axis of accelerometer 40 to points substantially north and the sensing, or $z$ axis of accelerometer 42 to points substantially west.

Figure 6:
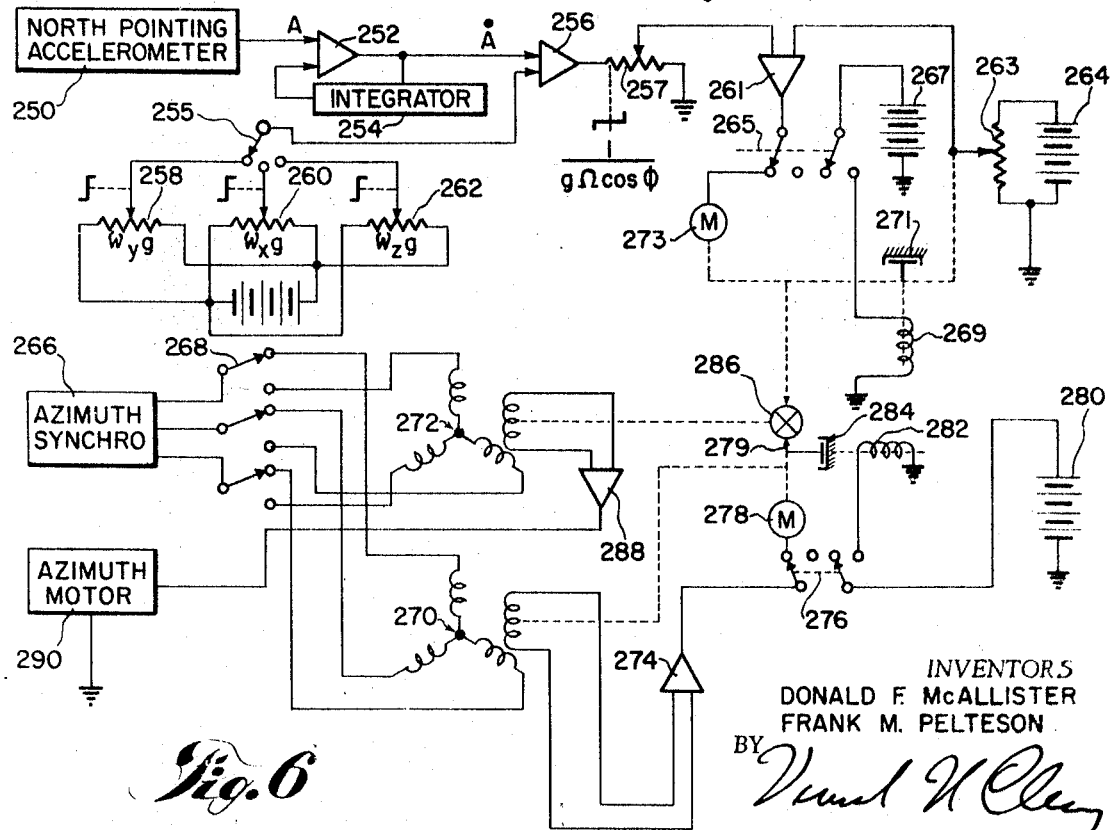
FIG. 6 is a schematic diagram of a first analog computation network used to obtain the direction and magnitude of the angular velocity of drift of the platform relative to a Cartesian coordinate system which is fixed on the platform.

In FIG. 6 analog computer means is adapted to generate signals which are a measure of the error in the azimuth angle between the substantially north pointing accelerometer sensing axis and the direction of the true north. The computer of FIG. 6 also generates signals which, transmitted to the gimbal system which supports the platform 20, servos or corrects the azimuth angle to cause the sensing, axis of the substantially north pointing accelerometer to point more accurately toward true north.

A north-pointing accelerometer 250 which, may be, in one particular sequence of operation, consecutively accelerometer 38, accelerometer 42, and accelerometer 40, is connected to the input of a differentiating circuit comprising an amplifier 252 with a feedback integrator 254. The output of amplifier 252 A, which is a measure of the time derivative of the input A to amplifier 252, is connected to the input of summing amplifier 256. A second input to amplifier 256 is obtained from the movable arm of potentiometer 258, from the movable arm of potentiometer 260, or from the movable arm of potentiometer 262, depending upon the position of switch 255. The position of the movable arm of potentiometers 258, 260, and 262 is a measure of the previously estimated or computed angular velocity of platform 20 about the $y$, $x$, and $z$ axes, respectively, whichever is in the substantial east-west direction during the particular phase of the calibration. The position of the movable arms of potentiometers 258, 260, and 262 may be set in accordance with the output readings of the device of FIG. 7. The electrical output of amplifier 256 is connected across the fixed terminals of potentiometer 257. The movable arm of potentiometer 257 is mechanically positioned, in accordance with predetermined calculations, to cause the voltage on the movable arm to be equal to the voltage at the output of amplifier 256 divided by $g\omega \cos \Phi$ where "$g$" is the acceleration of gravity, $\omega$ is the angular velocity of the earth, and $\Phi$ is the local latitude angle. The electrical output on the movable arm of potentiometer 257 is a measure of the azimuth error angle, $a_o$ in FIG. 8.

Potentiometer 257 is connected by its movable arm to the input of servoamplifier 265. Servoamplifier 261 is connected through switch 265 in the position shown to drive motor 273 to cause the shaft rotation of motor 273 to be proportional to the input of amplifier 261, and hence proportional to $a_o$. A potentiometer 263 and voltage source 264 is used to convert the angle position of the shaft of motor 273 into an appropriate voltage to be fed back to the input of amplifier 261. Switch 265 is connected to the position shown to connect the output of amplifier 261 to the input of motor 273 and in the other position to connect voltage source 267 to energize the magnetic winding 269 which actuates a clutch 271 to hold the position of the shaft of motor 262.

Azimuth synchro 266 may be synchro 184 or synchro 196 depending upon the orientation of platform 20. When the platform is oriented as shown in FIG. 3, it is synchro 184. When the platform is oriented as shown in FIG. 4 or as shown in FIG. 5, it is synchro 196.

Azimuth synchro 266 in FIG. 6 is connected through switch 268 in the position shown to the stator winding of control transformer 270 or 272 in the other position. The rotor of synchro 270 is electrically connected to the input of amplifier 274 whose output is connected through switch 276 in the position shown to driver motor 278. Motor 278 is connected by an output shaft to the rotor of control transformer 270 to drive the rotor of transformer 270 in a direction to cause the voltage to be reduced to zero at the input of amplifier 274.

The servoloop consisting of synchro control transformer 270, servoamplifier 274, and motor 278, repeats the angle, $\mu_o$, indicated electrically by azimuth synchro 266. $\mu_o$ is a measure of the angle between gimbals 28 and 31 in FIGS. 4 and 5, or between stable element 20 and gimbal 24 in FIG. 3. When the platform assumes the attitudes shown in FIGS. 3, 4, or 5 in which the controlling accelerometer outputs are zero, and in which the outermost axes 33 and 34 of the supporting means are reasonably level, angle $\mu_o$ represents the azimuth angle of the stable element 20 relative to the supporting means.

When switches 265 and 276 are switched to the right, windings 269 and 282 of brake clutches 271 and 284 are energized from sources 267 and 280 and motors 273 and 278 are deenergized. Clutches 271 and 284 grasp and hold the shafts of motors 273 and 278, respectively.

The shafts of motors 262 and 278 are connected through a differential 286 whose output shaft is connected to drive the rotor of control transformer 272. The position of the output shaft of differential 286 has an angle, $\mu_o - a_o = \mu_1$ which is a measure of the difference between the computed azimuth error $a_o$ of the position of the north-pointing accelerometer and the angle $\mu_o$ measured by azimuth synchro 266. Switch 268 is moved to its down position to connect synchro 266 to the stator of transformer 272. The rotor of control transformer 272 is connected through amplifier 288 to azimuth motor 290 to servo the angle $\mu_o$ into $\mu_1$, with the north-pointing accelerometer pointing more precisely north.

Azimuth motor 290 may be motor 57 or motor 64. When the platform is oriented as shown in FIG. 3, motor 290 is motor 57. When the platform is oriented as shown in FIGS. 4 and 5, motor 290 is motor 64.

In the analog computer of FIG. 7, the west-pointing accelerometer 300 may be accelerometer 38, accelerometer 40, or accelerometer 42. When the platform is oriented as shown in FIG. 3, it is accelerometer 40, in FIG. 4 it is accelerometer 38, and in FIG. 5 it is accelerometer 42.

Accelerometer 300 is connected through a differentiating network comprising amplifier 302 and feedback integrator 304. The output of the differentiating circuit is proportional to the time rate of change of the component of the gravity force measured by accelerometer 300. For small angles, this accelerometer output signal is a measure of the tilt rate about the north-south axis of platform 20. The output of amplifier 302 is connected to the input of summing or difference amplifier 306. A second input to amplifier 306 is a voltage which is proportional to the acceleration of gravity times the local horizontal component of the earth's angular velocity. The second input is obtained by mechanically positioning potentiometer 308, connected across a source of voltage 310. The output of amplifier 306 is its input divided by the acceleration of gravity, which is a measure of the computed value of angular velocity in inertial space about the particular $x$, $y$, or $z$ axis of platform 20 which is then pointing north. The output of amplifier 306 is connected to a servoamplifier 312. The output of amplifier 312 is connected through switch 314 to motor 316, motor 318, or motor 320 depending on the position of switch 314. Motors 316, 318, and 320 drive dial gauges 322, 324, and 326, respectively. Motors 316, 318, and 320 also drive the movable arms of potentiometers 328, 330, and 332, respectively. Potentiometers 328, 330, and 332 are energized by voltage source 334. The voltages appearing on the movable arms of potentiometers 328, 330, and 332 are fed back through switch 314 through the input of servoamplifier 312 to cause the shafts of motors 316, 318, and 320 to assume shaft positions which are measures of the angular velocities of platform 20 about the sensitive axis of the particular accelerometer which is then pointing in a north direction.

In the calibrating process of FIGS. 3, 4, and 5, the $x$ axis is first oriented approximately north (FIG. 3) with the $y$ axis approximately west. An estimate is made of the drift of platform 20 about the $y$ axis. This estimate is an educated guess, perhaps made upon the basis of the known or estimated drift of the individual instruments 80, 82, and 84. The angular velocity of rotation of platform 20 about the $y$ axis is computed. The angular velocity about the $y$ axis arises from misalignment $a_o$ of the $y$ axis from a true west direction. The misalignment is computed, and the alignment of the $x$ and $y$ axes with respect to true north and west is corrected.

After the alignment of the $x$ axis is corrected, and angular velocity of platform 20 about the $x$ axis is computed from the measured rate of change of the gravity component sensed by accelerometer 40. The known horizontal component of earth rotation rate is subtracted from this computed angular velocity to obtain a first approximate measure of the drift angular velocity of platform 20 about the $x$ axis.

The platform is next oriented with the $x$ axis west and the $z$ axis north (FIG. 4). The previously computed first approximate measure of the drift angular velocity of platform 20 about the $x$ axis is used to compute a correction to align the $z$ and $x$ axes more closely to true north and west, respectively.

The drift angular velocity of platform 20 about the z axis is next computed.

The platform is next oriented with the z axis west and the y axis north (FIG. 5). The previously computed measure of the drift angular velocity of platform 20 about the z axis is used to compute a correction to align the y and z axes more closely to true north and west, respectively.

The drift angular velocity of platform 20 about the y axis is next computed to a predetermined high level of accuracy.

The drift angular velocity of platform 20 about the x axis is next recomputed, after alignment, to a predetermined high level of accuracy.

By successively indexing the axes, in order, from north to west, the accuracy of alignment on each succeeding step is better than previously realized. The accuracy of alignment, measurement, computation, and calibration converges to a suitably fine magnitude by this means.

Preparatory to calibrating the angular velocity of platform 20, accelerometers 38 and 40 are connected as shown in FIG. 3. The gravity component sensed by accelerometers 38 and 40 causes motors 66 and 64 to rotate to return to zero the outputs of accelerometers 38 and 40. To control properly the motors 64 and 66 it is important that accelerometers 38 and 40 point in the directions shown in FIG. 3. The shafts 29 and 30 are aligned in an approximately north-south direction. That is, shafts 29 and 30 are aligned as near as practicable to a north-south direction. The mechanical input 190 of synchro differential transformer 180 is then adjusted to position, in azimuth, the sensitive axes of accelerometers 38 and 40 to cause the sensitive axis of accelerometer 38, and hence the x axis of platform 20, to point in an improved northerly direction. The sensitive axis of accelerometer 40, and hence of the y axis of platform 20, is pointed in an improved westerly direction. The preliminary pointing accuracy in pointing accelerometer 38 sensing axis north by use of synchro angle transducers is not sufficiently accurate to proceed with the calibration. Hence, the following procedure will be necessary to improve the pointing accuracy. Typically, the preliminary pointing accuracy of the x axis of platform 20 may be a degree or so away from the true north direction.

Referring to FIG. 6, potentiometer 258 is adjusted to an estimated value of $\Omega_y g$, the aforementioned educated guess of the y axis drift rate multiplied by the gravity acceleration. Switch 268 is placed in its upward position. Switches 265 and 276 are placed in the position shown. Control of the gimbals which support platform 20 is then rapidly switched to the circuit shown in FIG. 1 to cause the vibrating string instruments to control orientation of platform 20. The north-pointing accelerometer, which in FIG. 3 is accelerometer 38, is connected to the input of amplifier 252. The azimuth synchro 266 (184 in FIG. 3) is connected to the input of switch 268.

If the sensitive axis of one accelerometer (for example accelerometer 38) were pointing to the true north, and if the sensitive axis of a second accelerometer (for example accelerometer 40) were pointing in the direction of true west, any rotation of platform 20 about the y axis would be due alone to drift of the platform.

Because the sensitive axis of accelerometer 40 is not aligned in a true western direction, the rotation of platform 20 about the y axis has an additional component of the earth's rotation. In the calibration, it is proposed to differentiate the output of accelerometer 38 and to use the differentiated output $\dot{A}_x$ as a measure of the angular velocity relative to the earth of platform 20 about y axis. The time derivative of $\dot{A}_x$ is divided by $g$, the acceleration of gravity, to convert it to units of angular velocity. As long as the off-level angle of platform 20 about the x axis is small, the angular velocity of platform 20 about the y axis is approximated by $\dot{A}_x$ divided by $g$. This latter quantity in fact is equal to the sum of the angular velocity due to the azimuth error induced component of earth rotation $\omega\alpha_0 \cos \Phi$ plus the angular velocity of the platform drift about the y axis, designated $\alpha_y$.

Stating the above equality with an appropriate preservation of sense, one obtains: $\omega_y = \Omega\alpha_0 \cos \phi = \dfrac{\dot{A}_x}{g}$ from which one may solve for $\alpha_0$:

$$\alpha_0 = -\frac{(\dot{A}_x - g\omega y o)}{g\Omega \cos \phi}$$

Depending on whether the platform is oriented as shown in FIGS. 3, 4, and 5, the subscripts of $\alpha_0$, $\dot{A}_x$, and $\omega_y$ will be altered to furnish proper identification.

The computer in FIG. 6 mechanizes the following equations as a function of the position of switch 255, FIG. 6, with signals from the corresponding structures of FIGS. 3, 4 and 5.

| FIG. 6 Switch 255 Connected to Potentiometer | Mechanization Equation |
|---|---|
| 258 | $\alpha_1 = -\dfrac{(\dot{A}_{xo} - g\omega_{yo})}{g\Omega \cos \phi}$ |
| 260 | $\alpha_2 = -\dfrac{(\dot{A}_z - g\omega_x)}{g\Omega \cos \phi}$ |
| 262 | $\alpha_3 = -\dfrac{(\dot{A}_y - g\omega_z)}{g\Omega \cos \phi}$ |
| 258 (repeat) | $\alpha_4 = -\dfrac{(\dot{A}_x - \omega_y)}{g\Omega \cos \phi}$ | where
$\alpha_1$ = computed azimuth error $\alpha_0$ of x axis in FIG. 3
$\alpha_2$ 32 computed azimuth error $\alpha_0$ of z axis in FIG. 4
$\alpha_3$ = computed azimuth error $\alpha_0$ of y axis in FIG. 5
$\alpha_4$ = computed azimuth error $\alpha_0$ of x axis in FIG. 3
$g$ = observed value of gravity at the test station
$\Phi$ = geographic latitude
$\omega_{yo}$ = initial estimate of west axial angular rate about the y axis of FIG. 3
$\omega_x$ = calibrated angular rate about the x axis of FIG. 3
$\omega_z$ = calibrated angular rate about the z axis of FIG. 4
$\omega_y$ = calibrated angular rate about the y axis of FIG. 5
$\Omega$ = earth angular rate
$\dot{A}_{xo}$ = north accelerometer output rate in FIG. 3
$\dot{A}_z$ = north accelerometer output rate in FIG. 4
$\dot{A}_y$ = north accelerometer output rate in FIG. 5
$\dot{A}_x$ = north accelerometer output rate in FIG. 3 repeated The computer of FIG. 6 is adapted to solve the above four equations by analog computer means to obtain a value for $\alpha_0$ (see FIG. 8) which is translated into an electrical signal adapted to control motor 290 to align the sensitive axis of the approximately north-pointing accelerometer 250 into the direction of true north.

In FIG. 6, amplifier 252 and feedback integrator 254 differentiate the signal from accelerometer 250. Summing amplifier 256 sums the differentiated acceleration signal with a signal which is a measure of the angular velocity of platform 20 about the y axis multiplied by the acceleration of gravity.

In the first approximation in the calibration process of this invention, the position of the movable arm of potentiometer 258, which generates a signal which is a measure of $\omega y g$, is set to a position which is a measure of the estimated value of $\omega_y g$.

Potentiometer 257 is preset in accordance with the known acceleration of gravity, and the known northward component of angular velocity of the earth, $\Omega \cos \Phi$, in order to divide the output signal from amplifier 256 by a factor $g\Omega \cos \Phi$. The signal appearing on the movable arm of potentiometer 257 is a measure of the computed value of $\alpha_0$.

Servoamplifier 261, together with potentiometer 263, attached to the shaft of motor 273, causes the shaft position of motor 273 to be positioned at an angle which is a measure of platform azimuth angle $\alpha_0$.

Azimuth synchro 266 generates a signal which is a measure of the angle between (for example in FIG. 3) a predetermined reference on the gimbal structure and the direction of the X axis of platform 20. The signal from synchro 266 is connected through control transformer 270 which actuates a servoamplifier 274 and motor 278 to drive shaft 279 through an angle which is a measure of the angle $\mu_o$ (see FIG. 8) between the sensitive axis of the approximately north-pointing accelerometer and a reference position on the gimbals.

Differential 286 causes a shaft rotation and rotation of the rotor of synchro control transformer 272 which is proportional to $\alpha_o - \mu_o$. Switches 265, 276, and 268 are now transferred to cause brake clutches 269 and 282 to be energized and locked and to cause synchro 266 to be connected to the stator windings of control transformer 272. Azimuth motor 290 (for example, motor 57 of FIG. 3) is controlled in response to the signal at the output of amplifier 288, which is connected by its input to the rotor of control transformer 272. With switch 268 in the down position, the signal at the output of the rotor of control transformer 272 is a measure of the instantaneous angle between the true north position, calculated by the computer of FIG. 6, and the north directed accelerometer. Thus, the north directed accelerometer is servoed into alignment with the computer true north position.

After the north-pointing accelerometer has been servoed to the computed true north position, the computer of FIG. 7 is actuated. Platform 20 is allowed to drift about the north axis due both to the drift of the platform and the rotation of the earth. The rotation of platform 20 about the north-pointing axis of the platform 20 is detected by the west-pointing accelerometer. The signal generated by accelerometer 300 is differentiated by the combination of amplifier 302 and feedback integrator 304 to generate a signal, at the input of difference amplifier 306, which is proportional to the time derivative of the output of accelerometer 300. A second signal, which is proportional to $g\Omega \cos \Phi$, the local north component of earth angular velocity is inserted into amplifier 306 and subtracted from the $\dot{A}$ signal. The scale factor of amplifier 306 is proportional to $1/g$ whereby the output of amplifier 306 is a measure of the controlled drift of platform 20 about the north-pointing axis (for example, in FIG. 3, about the X axis).

When switch 314 is positioned in the position shows amplifier 312 and potentiometer 328 servo the shaft position of motor 316 to be a measure of the electrical output, $\omega_x$ of amplifier 306. A mechanical device such as dial 322 is used to measure the shaft position of motor 316.

The computer in FIG. 7 mechanizes the following equations:

| FIG. 7 Switch 314 Position | Angular Rate Component Computation Mechanization |
|---|---|
| Up | $\omega_{x_o} = \dfrac{\dot{A}_y + g\Omega \cos \phi}{g}$ |
| Center | $\omega_o = \dfrac{\dot{A}_x + g\Omega \cos \phi}{g}$ |
| Down | $\omega_y = \dfrac{\dot{A}_z + g\Omega \cos \phi}{g}$ |
| Up (repeat) | $\omega_{x_1} = \dfrac{\dot{A}_y + g\Omega \cos \phi}{g}$ | where $\omega_x$ is the improved determination of $\omega_{x_o}$, using azimuth error $\alpha_4$ instead of azimuth error $\alpha_1$.

The shaft position of the motor 316 and the position of dial 322 is used to adjust the position of potentiometer 260 of FIG. 6. The information obtained from dial 322 is more accurate than the guess which was previously used to set potentiometer 258.

The platform 20 is then oriented as shown in FIG. 4 with the Z axis pointing nominally north and the X axis pointing nominally west. Differential transformer 198 controls motor 64 for fine adjustment of orientation. The accelerometers 38 and 42 are leveled by using their outputs to control motors 66 and 57 until accelerometers 42 and 38 have no output. Platform 20 is then allowed to be controlled by the outputs of instruments 80, 82, and 84 in accordance with the description of operation of the device of FIG. 1.

The north-pointing accelerometer 250 is now accelerometer 42 and the west-pointing accelerometer 300 is now accelerometer 38. Switch 255 is switched to contact the arm of potentiometer 260. Switches 268, 265, and 276 are repositioned into the position shown in the FIG. 6. Azimuth synchro 266 is now synchro 196 and azimuth motor 290 is now motor 64. The output of accelerometer 42 is used to calculate, at the movable arm of potentiometer 257, a new $\alpha_o$ which is a measure of the angle between the sensitive axis of accelerometer 42 and the true north. It is to be recognized that this calculation is more accurate than that achieved in the initial calculations for the setting of FIG. 3 because of the increased accuracy of knowing the position to which the arm of potentiometer 260 can be set over knowing the position for setting the arm of potentiometer 258.

The output shaft of differential 286 is a measure of $\alpha_o$ minus $\mu_o$ where $\mu_o$ is the angle measured by synchro 196. Motor 64 (290 in FIG. 6) drives gimbal 28 to cause the sensitive axis of accelerometer 42 to be pointed in the direction of the true north.

The west-pointing accelerometer 300 (accelerometer 38 in FIG. 4) is connected through the differentiating circuit of amplifier 302 and integrator 304, through difference amplifier 306 to generate a signal at the output of amplifier 306 which is a measure of $\omega_z$, the drift angular velocity of platform 20 about the Z axis. Switch 314 is positioned into its centertap position. Servoamplifier 312, together with potentiometer 330, causes the motor 318 to drive its shaft into position which is a measure of $\omega_z$. A measure of $\omega_z$ may be read directly from dial 324.

The measurement appearing on dial 324 is used to set the position of potentiometer 262. It is to be recognized that the setting of potentiometer 262 is more accurate than the previous setting of potentiometers 258 and 260.

Platform 20 is now placed in the third orientation, as shown in FIG. 5, of the described calibration sequence of this invention. The Y axis of platform 20 is positioned in a north direction and the Z axis is positioned in a west direction. That is, the sensitive axis of accelerometer 40 is positioned in a north direction and the sensitive axis of accelerometer 42 is positioned in a west direction.

The sensitive axes of accelerometers 40 and 42 are leveled by allowing accelerometers 40 and 42 to control motors 57 and 66 until no signal appears at the accelerometer output terminals.

Instruments 80, 82, and 84 are then allowed to control platform 20, as set forth above, in the description of the operation of the device in FIG. 1.

The north-pointing accelerometer 250 of FIG. 6 is now accelerometer 40. The azimuth synchro 266 of FIG. 6 is now synchro 196. The azimuth motor 290 of FIG. 6 is now motor 64. The west-pointing accelerometer 300 of FIG. 7 is now accelerometer 42.

In FIG. 6, switch 255 is connected to the movable tap of potentiometer 262. Switches 268, 265, and 276 are returned to the position shown in FIG. 6. The output of accelerometer 42 is differentiated by amplifier 252 and integrator 254, and applied to the input of summing amplifier 256 where it combines with the signal from the movable arm of potentiometer 262. The new value $\alpha_o$ between the direction of the sensitive axis of accelerometer 42 and the true north is computed on the movable arm of potentiometer 257.

The shaft of motor 273 is servoed to have its angle to be measure of $\alpha_o$. The shaft of motor 278 is servoed to have its shaft angle be a position of the angle sensed by synchro 196. The output shaft of differential 286 has an angular measure which is a measure of the difference between $\alpha_o$ and $\mu_o$ where $\mu_o$ is the angle sensed by synchro 196. That is, the shaft angle at the output of differential 286 is the angle through which motor 64 must turn to align the Z axis with the true north. When switches 268, 265, and 276 are switched, motor 64 is servoed to align the sensitive axis of accelerometer 40 into the direction of the true north.

West-pointing accelerometer 300 (accelerometer 42 in FIG. 5) is connected through a differentiating circuit to cause the output of amplifier 306 to be a measure of $\omega_y$. Switch 314 is moved into its third position which connects the output of amplifier 312 to motor 320 and its feedback input to the movable arm of potentiometer 32. Servoamplifier 312 servos the shaft of motor 320 into an angular position which is a measure of $\omega_y$. Dial 326, connected to the shaft of motor 320, reads a measure of $\omega_y$. The accuracy of $\omega_y$ is very precise compared to the original estimate used in the first calibration of the sequence. The reading of $\omega_y$ which appears on shaft 326 may be used to readjust the movable arm of potentiometer 258.

The calibration step with the platform oriented as shown in FIG. 3 is then repeated using the precision-adjusted position of potentiometer 258 as the basis for calculation of $\omega_x$.

Thus the readings of dial 322, 324, and 326 are a true measure of $\omega_x$, $\omega_z$, and $\omega_y$, the controlled angular drift rates of platform 20 about their own coordinate axes.

METHOD FOR RELATING ACCELERATION SIGNALS IN A FIRST COORDINATE SYSTEM TO A SECOND COORDINATE SYSTEM

From the above described calibration technique, the components $\omega_x$, $\omega_y$, and $\omega_z$ of the angular velocity of drift of platform 20 are obtained. These components of drift will be used as an aid in determining the direction cosines of the rotating platform.

To practice this invention, the outer gimbal must be rotatable about a nonvertical axis, the intermediate gimbal must be rotatable about a cross-level axis relative to the outer gimbal, and the platform must be rotatably, relative to the intermediate gimbal, about an axis perpendicular to the cross-level axis.

In the described device which has its accelerometer outputs transformer by this invention, outer gimbal 31 is rotatable upon shafts 33 and 34 about a substantially level axis. Although the axis of shafts 33 and 34 is usually parallel to the roll axis of the supporting craft (and is so described herein), it may be oriented in any desired azimuth (for example, parallel to the pitch axis of the supporting craft).

Intermediate gimbal 28 is rotatable relative to outer gimbal 37 about the cross-level axis of shafts 29 and 30. The cross-level axis is designated herein to correspond to the pitch axis of the craft. The important characteristic of the cross-level axis is that it is level. As long as the axis of shafts 33 and 34 are nonvertical, rotation of the shafts may be used to level the cross-level axis.

Gimbals 24 and 28 may, for the purposes of this invention, be considered as one gimbal since they are constrained or servoed to move together. The cross-level axis of shafts 29 and 30 is leveled by servoing motor 66, through resolver 58 and amplifier 62, to the outputs of accelerometers 38 and 40.

Principles of Operation.

Orientation information is obtained by observing the outputs of three mutually orthogonal accelerometers mounted on the freely precessing gyro platform and by computing therefrom the direction cosines of the platform.

Because the platform accelerometer outputs can be transformed by means of a time-varying similarity transformation into inertial coordinates, the direction cosines of the inertial coordinates so formed are to be computed by using the accelerometer outputs. The direction cosines so computed are fixed in time and need no further computation, once they are determined.

In principle, the outputs of the three accelerometers can be related to horizontal earth rotating coordinates by $$\begin{pmatrix} 0 \\ 0 \\ g \end{pmatrix} = \phi E_{cb} \begin{pmatrix} A_x \\ A_y \\ A_z \end{pmatrix} \quad (1)$$

where $$b = \begin{pmatrix} a_1^2 + (1-a_1^2)\cos\omega_e t & a_1 a_2(1-\cos\omega_e t) - a_3 \sin\omega_e t & a_1 a_3(1-\cos\omega_e t) + a_2 \sin\omega_e t \\ a_1 a_2(1-\cos\omega_e t) + a_3 \sin\omega_e t & a_2^2 + (1-a_2^2)\cos\omega_e t & a_2 a_3(1-\cos\omega_e t) - a_1 \sin\omega_e t \\ a_1 a_3(1-\cos\omega_e t) - a_2 \sin\omega_e t & a_2 a_3(1-\cos\omega_e t) + a_1 \sin\omega_e t & a_3^2 + (1-a_3^2)\cos\omega_e t \end{pmatrix} \quad (2)$$

which is the reduced similarity transformation that relates present platform orientation to the past inertial platform orientation at release $$c = \begin{pmatrix} c_{11} & c_{12} & c_{13} \\ c_{21} & c_{22} & c_{23} \\ c_{31} & c_{32} & c_{33} \end{pmatrix} \text{ the matrix to be determined} \quad (3)$$

$$E = \begin{pmatrix} 1 & 0 & 0 \\ 0 & \cos\Omega t & +\sin\Omega t \\ 0 & -\sin\Omega t & \cos\Omega t \end{pmatrix} \quad (4)$$

is the matrix that transforms the rotating earth centered co-ordinate system into a space fixed co-ordinate system $$\phi = \begin{pmatrix} \cos\phi & 0 & -\sin\phi \\ 0 & 1 & 0 \\ \sin\phi & 0 & \cos\phi \end{pmatrix} \quad (5)$$

is the matrix that transforms the rotating earth centered co-ordinate system along the correct astronomic latitude to a horizontal co-ordinate system wherein the acceleration conditions are given by the matrix $$\begin{pmatrix} 0 \\ 0 \\ g \end{pmatrix}$$

and $\omega_e$ is the inertial precession rate of the untorqued platform
$\Omega$ is the earth rate
$\Phi$ is the local astronomic latitude
$g$ is the local observed force of gravity
$A_x, A_y, A_z$ are the accelerometer outputs
$a_1 = (\omega_x/\omega_e)$; $a_2 = (\omega_y/\omega_e)$; $a_3 = (\omega_z/\omega_e)$ are the direction cosines that relate the spatial rate to its platform-fixed components.

It should be possible to extract the space-fixed accelerometer outputs $$b \begin{pmatrix} A_x \\ A_y \\ A_z \end{pmatrix}$$

from the computer.

Defining the space-fixed outputs by $$\begin{pmatrix} A_{x'} \\ A_{y'} \\ A_{z'} \end{pmatrix} \overset{\Delta}{=} b \begin{pmatrix} A_x \\ A_y \\ A_z \end{pmatrix} \quad (6)$$

then by inversion of $\phi$ and $E$ matrices in (1), $$E^{-1}\phi^{-1} \begin{pmatrix} 0 \\ 0 \\ g \end{pmatrix} = c \begin{pmatrix} A_x \\ A_y \\ A_z \end{pmatrix} \quad (7)$$

This expresses three equations in nine unknowns, where the nine $c_{ij}$ are the unknowns to be found. Hence, insufficient information exists to determine $c$. A second and third sampling of $A_x$, $A_y$, and $A_z$ a short time later could provide nine equations in nine unknowns.

From the above statements (i.e., the need for nine equations in nine knowns), it can be understood that three vectors of information are required to determine $c$. Furthermore, the more orthogonal these three vectors are, the more strongly determined $c$ will be. Hence, if three such vectors can be constructed from accelerometer outputs only, the determination of $c$ will be possible. The first vector was already mentioned in Equation (7), being $$-\bar{g} = \bar{A} \quad (8)$$

A second vector is constructed from the accelerator outputs by differentiating the three accelerometer outputs that exist after the similarity transformation; i.e., in inertial space $$(d/dt)_i \bar{A} = \bar{\Omega} \times (-\bar{g}) \quad (9)$$

Clearly, the second vector is perpendicular to the first, which is desirable.

To construct the third vector from accelerometer information so that it is mutually perpendicular to the first two, taken the cross-product of Equations (8) and (9).

$$-\bar{g} \times (\bar{\Omega} \times (-\bar{g})) = \bar{A} \times (d/dt)_i \bar{A} \quad (10)$$

where $(d/dt)_i$ denotes the derivative in inertial space.

FIG. 9 illustrates the geometrical relation between the various vectors. Axes $\bar{x}_o$, $\bar{y}_o$ and $\bar{z}_o$ are the inertial fixed platform axes. Axes $\bar{X}$, $\bar{Y}$ and $\bar{Z}$ are the inertially fixed earth centered reference axes relative to which the orientation cosines of $x_o$, $y_o$ and $z_o$ are to be determined. Axes $x_a$, $y_a$ and $z_a$ are related to axes $x_o$, $y_o$ and $z_o$ by the $b$ matrix of (2), being the platform body axes, shown to be in motion by the hachures in the figure. Equations (8), (9), and (10) have to be expressed in terms of matrix $c$. Equation (7), already stated, expresses (5) in terms of $c$. Equation (9), in terms of $c$ is:

$$\dot{E} - 1\phi - 1 \begin{pmatrix} 0 \\ 0 \\ g \end{pmatrix} = c \begin{pmatrix} \dot{A}'_x \\ \dot{A}'_y \\ \dot{A}'_z \end{pmatrix} \quad (11)$$

Equations (7) and (11) can be expanded as follows, respectively, $$\begin{pmatrix} g \sin \phi \\ -g \cos \phi \sin \Omega t \\ g \cos \phi \sin \Omega t \end{pmatrix} = \begin{pmatrix} c_{11} c_{12} c_{13} \\ c_{21} c_{22} c_{23} \\ c_{31} c_{32} c_{33} \end{pmatrix} \begin{pmatrix} A'_x \\ A'_y \\ A'_z \end{pmatrix} \quad (12)$$

and $$\begin{pmatrix} 0 \\ -\Omega g \cos \phi \cos \Omega t \\ -\Omega g \cos \phi \sin \Omega t \end{pmatrix} = \begin{pmatrix} c_{11} c_{12} c_{13} \\ c_{21} c_{22} c_{23} \\ c_{31} c_{32} c_{33} \end{pmatrix} \begin{pmatrix} \dot{A}'_x \\ \dot{A}'_y \\ \dot{A}'_z \end{pmatrix} \quad (13)$$

To take the cross-product of the two left sides of Equations (12) and (13) results in the column matrix $$\begin{pmatrix} \Omega g^2 \cos^2 \phi \\ \Omega g^2 \sin \phi \cos \phi \sin \Omega t \\ -\Omega g^2 \sin \phi \cos \phi \cos \Omega t \end{pmatrix} \quad (14a)$$

To take the cross-product of the two right sides of Equations (12) and (13) results, if it is realized that the cross-product of two transformed vectors equals the transformed cross-product of the two vectors (if the transformation is orthogonal and does not violate the right-hand rule that is in customary use here) in:

$$\begin{pmatrix} c_{11} & c_{12} & c_{13} \\ c_{21} & c_{22} & c_{23} \\ c_{31} & c_{32} & c_{33} \end{pmatrix} \begin{pmatrix} A'_y & \dot{A}'_z - A'_z & \dot{A}'_y \\ A'_z & \dot{A}'_x - A'_x & \dot{A}'_z \\ A'_x & \dot{A}'_y - A'_y & \dot{A}'_x \end{pmatrix} \quad (14b)$$

Equations (12), (13), (14a) and (14b) provide nine equations in the nine unknowns of $c$.

Equations (12), (13), (14a) and (14b) could be arrayed in a nine-by-nine matrix configuration. However, it is more convenient to array matrix Equations (12), (13), (14a) and (14b) in a row, taking advantage of the face that $c$ is a common matrix to all three equations.

$$\begin{pmatrix} g \sin \phi & , 0 & , \Omega g^2 \cos^2 \phi \\ -g \cos \phi \sin \Omega t, & -\Omega g \cos \phi \cos \Omega t, & \Omega g^2 \sin \phi \cos \phi \sin \Omega t \\ g \cos \phi \cos \Omega t & , -\Omega g \cos \phi \sin \Omega t, & -\Omega g^2 \sin \phi \cos \phi \sin \Omega t \end{pmatrix}$$

$$= \begin{pmatrix} c_{11} & c_{12} & c_{13} \\ c_{21} & c_{22} & c_{23} \\ c_{31} & c_{32} & c_{33} \end{pmatrix} \begin{pmatrix} A'_x, & \dot{A}'_x, & A'_y & \dot{A}'_z - A'_z & \dot{A}'_y \\ A'_y, & \dot{A}'_y, & A'_z & \dot{A}'_x - A'_x & \dot{A}'_z \\ A'_z, & \dot{A}'_z, & A'_x & \dot{A}'_y - A'_y & \dot{A}'_x \end{pmatrix}$$

((15))

or, $$G = cA \quad (16)$$

in matrix notation.
Solving Equation (15) for $c$, $$c^{11} = A G^{11} \quad (17)$$

Because $c^{11} = c^t$ (transposed $c$ matrix rows and columns interchanged), the expansion of Equation (17) yields the transformation mechanization, where the first column of $G$ and $A$ will be divided by $g$; the second column by $\Omega g$, and the third column by $\Omega g^2$ for normalization purposes. Expanding Equation (17) yields the final resulting nine equations for calculating the nine values of the platform's inertial direction cosines.

$$\begin{pmatrix} c_{11} & c_{21} & c_{31} \\ c_{12} & c_{22} & c_{32} \\ c_{13} & c_{23} & c_{33} \end{pmatrix} = \begin{pmatrix} \dfrac{A'_x}{g}, & \dfrac{\dot{A}'_x}{\Omega g}, & \dfrac{(A'_y \dot{A}'_z - A'_z \dot{A}'_y)}{\Omega g^2} \\ \dfrac{A'_y}{g}, & \dfrac{\dot{A}'_y}{\Omega g}, & \dfrac{(A'_z \dot{A}'_x - A'_x \dot{A}'_z)}{\Omega g_2} \\ \dfrac{A'_z}{g}, & \dfrac{\dot{A}'_z}{\Omega g}, & \dfrac{(A'_x \dot{A}'_y - A'_y \dot{A}'_x)}{\Omega g^2} \end{pmatrix}$$

$$\begin{pmatrix} \sin \phi, & -\cos \phi \sin \Omega t, & \cos \phi \cos \Omega t \\ 0 & , \dfrac{-\cos \Omega t}{\cos \phi} & , \dfrac{-\sin \Omega t}{\cos \phi} \\ 1 & , \tan \phi \sin \Omega t & , -\tan \phi \cos \Omega t \end{pmatrix} \quad (18)$$

Equation (18) is used to align the computer as mechanized by Equation (1).

Practical Application to Digital or Analog Computers.

It is generally impractical to differentiate and extract accelerometer outputs in specific force form for two reasons: (1) The accelerometer outputs are usually unavailable in specific force form, and (2) the accelerometer outputs if available in specific force form are noisy, and their derivatives would be noisier, unless special filtering were used.

The accelerometer outputs are usually available in integrable form, e.g., in the form of identical increments whose repetition rate is proportional to an accelerometer component of applied specific force. In analog terms, the available accelerometer output is usually the time integral of the specific force, not the specific force function itself. Hence, Equation (18) must be modified to make use of the available time integral outputs of the accelerometers for a fixed, short time interval T, instead of using the specific force and its derivative. The following is a modified form of Equation (18) that is capable of being mechanized for accelerometer outputs of practical form. An explanation of its use and a proof follows:

$$\begin{pmatrix} c_{11} & c_{21} & c_{31} \\ c_{12} & c_{22} & c_{32} \\ c_{13} & c_{23} & c_{33} \end{pmatrix}$$

$$= \begin{pmatrix} \dfrac{\Gamma XIa}{g^T}, & -\dfrac{\Delta \Gamma_{XIa}}{g \cos \phi \Omega T^2}, & \dfrac{\Delta_{YIa} \Delta \Gamma_{ZIa} - \Gamma_{YIa} \Delta \Gamma_{ZIa}}{g^2 \cos \phi \Omega T^3} \\ \dfrac{\Gamma YIa}{g^T}, & -\dfrac{\Delta \Gamma_{YIa}}{g \cos \phi \Omega T^2}, & \dfrac{\Gamma_{ZIa} \Delta \Gamma_{XIa} - \Gamma_{XIa} \Delta \Gamma_{ZIa}}{g^2 \cos \phi \Omega T^3} \\ \dfrac{\Gamma ZIa}{g^T}, & -\dfrac{\Delta \Gamma_{ZIa}}{g \cos \phi \Omega T^2}, & \dfrac{\Gamma_{XIa} \Delta \Gamma_{YIa} - \Gamma_{YIa} \Delta \Gamma_{XIa}}{g^2 \cos \phi \Omega T^3} \end{pmatrix}$$

$$\begin{bmatrix} \sin \phi & 0 \cos \phi \\ \dfrac{\Omega T \cos \phi \sin \phi}{2} & 1 \dfrac{\Omega T \cos \phi}{2} \\ \cos \phi & 0 - \sin \phi \end{bmatrix} \quad (19)$$

The Γ's are the fixed-time integrals of the resolved accelerometer outputs $A'_x$, $A'_y$, and $A'_z$, and the $\Delta\Gamma$'s are the differences of two successively taken resolved fixed-time Γ integrals; the accelerometer outputs are understood to be resolved before integration, into the inertial coordinates that the platform axes assume at the start of the resolving process, as shown in Equation (6).

In the case of using an analog computer, the following is mechanized for the first column of (b 19):

$$\begin{pmatrix}\Gamma_{XIa}\\ \Gamma_{YIa}\\ \Gamma_{ZIa}\end{pmatrix} \overset{\Delta}{=} \int_0^T \begin{pmatrix}b_{11}(u) & b_{12}(u) & b_{13}(u)\\ b_{21}(u) & b_{22}(u) & b_{23}(u)\\ b_{31}(u) & b_{32}(u) & b_{33}(u)\end{pmatrix}\begin{pmatrix}A_x(u)\\ A_y(u)\\ A_z(u)\end{pmatrix}du \quad (20)$$

where $b_{ij}(u)$ are the terms of the $b$ matrix of (2) that resolve A into the stated inertial platform coordinates. Furthermore, the following is mechanized for the second column of (19):

$$\begin{pmatrix}\Delta\Gamma_{XIa}\\ \Delta\Gamma_{YIa}\\ \Delta\Gamma_{ZIa}\end{pmatrix} \overset{\Delta}{=} \int_0^T \begin{pmatrix}b_{11} & b_{12} & b_{13}\\ b_{21} & b_{22} & b_{23}\\ b_{31} & b_{32} & b_{33}\end{pmatrix}\begin{pmatrix}A_x\\ A_y\\ A_z\end{pmatrix}du \quad (20)$$

$$-\left(\int_{-T}^0 \begin{pmatrix}b_{11} & b_{12} & b_{13}\\ b_{21} & b_{22} & b_{23}\\ b_{31} & b_{32} & b_{33}\end{pmatrix}\begin{pmatrix}A_x\\ A_y\\ A_z\end{pmatrix}du\right) \quad (21)$$

The third column consists of the operations stated in (19), using the results obtained in (20) and (21). Alternately, if an incremental accelerometer output is available, $$A_x = d\Gamma_x/dt, \quad A_y = d\Gamma_y/dt, \quad A_z = d\Gamma_z/dt \quad (22)$$

where $d\Gamma_i$ is the fixed-scale accelerometer increment. Hence, instead of, e.g., the first row of (20):

$$\Gamma_{XIa} = \int_0^T \left(b_{11}(u)\frac{d\Gamma_x}{du} + b_{12}(u)\frac{d\Gamma_y}{du} + b_{13}(u)\frac{d\Gamma_z}{du}\right)du \quad (23)$$

or as the Stieltje's integral $$\Gamma_{XIa} = \int_0^{\Gamma_x(T)} b_{11}(t)d\Gamma_x + \int_0^{\Gamma_y(T)} b_{12}(t)d\Gamma_y + \int_0^{\Gamma_z(T)} b_{13}(t)d\Gamma_z \quad (24)$$

and similarly for the other $b_{ij}$.

Since, in Digital Differential Analyzers only increments are added, $\Gamma_{XIa}$, the sum of all $d\Gamma_{XIa}$ increments, is represented by an integer defined as $$n_{XIa}\Big|_0^T \text{ and } \int_0^{\Gamma_x(T)} b_{11}d\Gamma_x \text{ is represented by } \sum_{i=0}^{i(T)} Kb_{11}(t_{xi})$$

and similarly for the other two terms of (24), where $K$ is a scale factor. From (2) as an example, $$b_{11}(t_{xi}) = a_1^2 + (1-a_1^2)\cos\omega_e(t_{xi} - t_o) \quad (25)$$

Similar types of expressions for the other eight $b_{ij}$ are given by (2). The time $t_{xi}$ is the event time at which the $i^{th} x_a$ accelerometer pulse is received in the computer. The number $b_{11}$ is of course also computed in the form of integers in a Digital Differential Analyzer. Hence, the following DDA equivalences exist:

$n_{XIa}\Big|_0^T \longleftrightarrow \Gamma_{XIa}$, $t_{xi} \longleftrightarrow$ event time of an $x$ accelerometer pulse $n_{YIa}\Big|_0^T \longleftrightarrow \Gamma_{YIa}$, $t_{yj} \longleftrightarrow$ event time of a $y$ accelerometer pulse $n_{ZIa}\Big|_0^T \longleftrightarrow \Gamma_{ZIa}$, $t_{zk} \longleftrightarrow$ event time of a $z$ accelerometer pulse Therefore Equation (20) becomes, when a Digital Differential Analyzer is used:

$$\begin{pmatrix}\Gamma_{XIa}\\ \Gamma_{YIa}\\ \Gamma_{ZIa}\end{pmatrix} = \sum_{i=0}^{i(T)} K \begin{pmatrix}b_{11}(t_{xi})\\ b_{21}(t_{xi})\\ b_{31}(t_{xi})\end{pmatrix} + \sum_{j=0}^{j(T)} K\begin{pmatrix}b_{12}(t_{yj})\\ b_{22}(t_{yj})\\ b_{32}(t_{yj})\end{pmatrix} + \sum_{k=0}^{k(T)} K\begin{pmatrix}b_{13}(t_{zk})\\ b_{23}(t_{zk})\\ b_{33}(t_{zk})\end{pmatrix} \quad (26)$$

and Equation (21) becomes for a Digital Differential Analyzer $$\begin{pmatrix}\Delta\Gamma_{XIa}\\ \Delta\Gamma_{YIa}\\ \Delta\Gamma_{ZIa}\end{pmatrix} = \sum_{i=0}^{i(T)} K\begin{pmatrix}b_{11}(t_{xi})\\ b_{21}(t_{xi})\\ b_{31}(t_{xi})\end{pmatrix} - \sum_{i=-1}^{i(-T)} K\begin{pmatrix}b_{11}(t_{xi})\\ b_{21}(t_{xi})\\ b_{31}(t_{xi})\end{pmatrix}$$

$$+ \sum_{j=0}^{j(T)} K\begin{pmatrix}b_{12}(t_{yj})\\ b_{22}(t_{yj})\\ b_{32}(t_{yj})\end{pmatrix} - \sum_{j=-1}^{j(-T)} K\begin{pmatrix}b_{12}(t_{yj})\\ b_{22}(t_{yj})\\ b_{32}(t_{yj})\end{pmatrix}$$

$$+ \sum_{k=0}^{k(T)} K\begin{pmatrix}b_{13}(t_{zk})\\ b_{23}(t_{zk})\\ b_{33}(t_{zk})\end{pmatrix} - \sum_{k=-1}^{k(-T)} K\begin{pmatrix}b_{13}(t_{zk})\\ b_{23}(t_{zk})\\ b_{33}(t_{zk})\end{pmatrix} \quad (27)$$

Proof of Equation (20).

The procedure to be adopted differs from that of Equation (15) in that the first column of both the G matrix and the A matrix are replaced by, not vectors $g$, and A, as seen in inertial coordinates (see FIG. 9), but by vectors $$\int_0^T \bar{g}du \text{ and } \int_0^T \bar{A}du$$

as they appear in inertial coordinates. Hence, the first column of the G matrix becomes for a short prefixed time interval T ($\sin\Omega T = \Omega T$, $\cos\Omega T = 1$).

$$\begin{bmatrix}\int_0^T g\sin\phi du\\ -\int_0^T g\cos\phi u du\\ \int_0^T g\cos\phi du\end{bmatrix} = \begin{pmatrix}g\sin\phi T\\ -g\cos\phi \frac{T^2}{2}\\ g\cos\phi T\end{pmatrix} \quad (28)$$

Because taking the single integral of the second column of both the A and G matrix in (15) is equivalent to taking the integral of the derivative of the resolved accelerometer outputs, this procedure will be considered impractical, since the accelerometer outputs are not available in direct or differentiable form. Instead, the double integral of the second columns of the G and A matrices may be examined. As an example, the double integral of $\dot{A}'_x$ is $$\int_0^T \int_0^v \frac{dA'_x}{du} du\, dv = \int_0^T [A'_x(v) - A'_x(0)]dv$$

$$= \int_0^T A'_x(v)dv - A'_x(0)T \quad (29)$$

Not, approximately, $$A'_x(0) \cong \frac{\int_{-T}^0 A'_x(v)dv}{T} \quad (30)$$

so that from (29) and (30), $$\int_0^T \int_0^v \frac{dA'_x}{du} du\, dv \cong \int_0^T A'_x(v)dv - \int_{-T}^0 A'_x(v)dv, \quad (31)$$

and similarly for $$\iint \dot{A}'_y du\, dv \text{ and } \iint \dot{A}'_z du\, dv.$$

Hence, from (31) one may consider the first columns of G and A as proportional to the average value of $\bar{g}$ over time interval $O \leq t \leq T$, and the second columns of G and A as proportional to the difference between two successive average values of $\bar{g}$. Thus, the two so-derived columns form vectors fulfilling very nearly the perpendicularity requirement, since the time-varying change of $g$ in inertial space is known to be perpendicular to $\bar{g}$. The perpendicularity of the two vectors so formed shall be examined. Note that in (31) the operation described is merely one of counting up inertially resolved accelerometer pulses over two successive fixed-time intervals, and of taking the difference of the two pulse sums for each component, for the DDA application.

Operating as well on the first column of the G matrix as specified by (31) for short fixed time T, the second column of the G matrix becomes:

$$\begin{pmatrix} \int_0^T g \sin\phi\, du - \int_{-T}^0 g \sin\phi\, du \\ -\int_0^T g \cos\phi\Omega u\, du + \int_{-T}^0 g \cos\phi\Omega u\, du \\ \int_0^T g \cos\phi\, du - \int_{-T}^0 g \cos\phi\, du \end{pmatrix} = \begin{pmatrix} 0 \\ -g \cos\phi\Omega T^2 \\ 0 \end{pmatrix} \quad (32)$$

Taking the cross-product of the two vectors of (28) and (32) results in the third column of the new G matrix:

$$\begin{pmatrix} g \cos^2\phi\Omega T^3 \\ -g \cos\phi \sin\phi\Omega T^3 \end{pmatrix}$$

Hence, recalling the definitions of (20) and (21), it is possible to relate all of the previously derived analytic vectors to their accelerometer counterparts, by the $c$ matrix:

$$\begin{pmatrix} g \sin\phi T & 0 & g \cos^2\phi\Omega T^3 \\ -g \cos\phi\frac{\Omega T^2}{2} & -g \cos\phi\Omega T^2 & 0 \\ g \cos\phi T & 0 & -g \cos^2\phi \sin\phi\Omega T^3 \end{pmatrix}$$

$$= \begin{pmatrix} c_{11} & c_{12} & c_{13} \\ c_{21} & c_{22} & c_{23} \\ c_{31} & c_{32} & c_{33} \end{pmatrix}$$

$$\begin{pmatrix} \Gamma_{XIa} & \Delta\Gamma_{XIa} & \Gamma_{YIa} & \Delta\Gamma_{ZIa} - \Gamma_{ZIa} & \Delta\Gamma_{YIa} \\ \Gamma_{YIa} & \Delta\Gamma_{YIa} & \Gamma_{ZIa} & \Delta\Gamma_{XIa} - \Gamma_{XIa} & \Delta\Gamma_{ZIa} \\ \Gamma_{ZIa} & \Delta\Gamma_{ZIa} & \Gamma_{XIa} & \Delta\Gamma_{YIa} - \Gamma_{YIa} & \Delta\Gamma_{XIa} \end{pmatrix} \quad (33)$$

Inverting the $c$ and G matrix of (15) will obtain Equation (19).

Analog Computer Mechanization.

Figure 10:
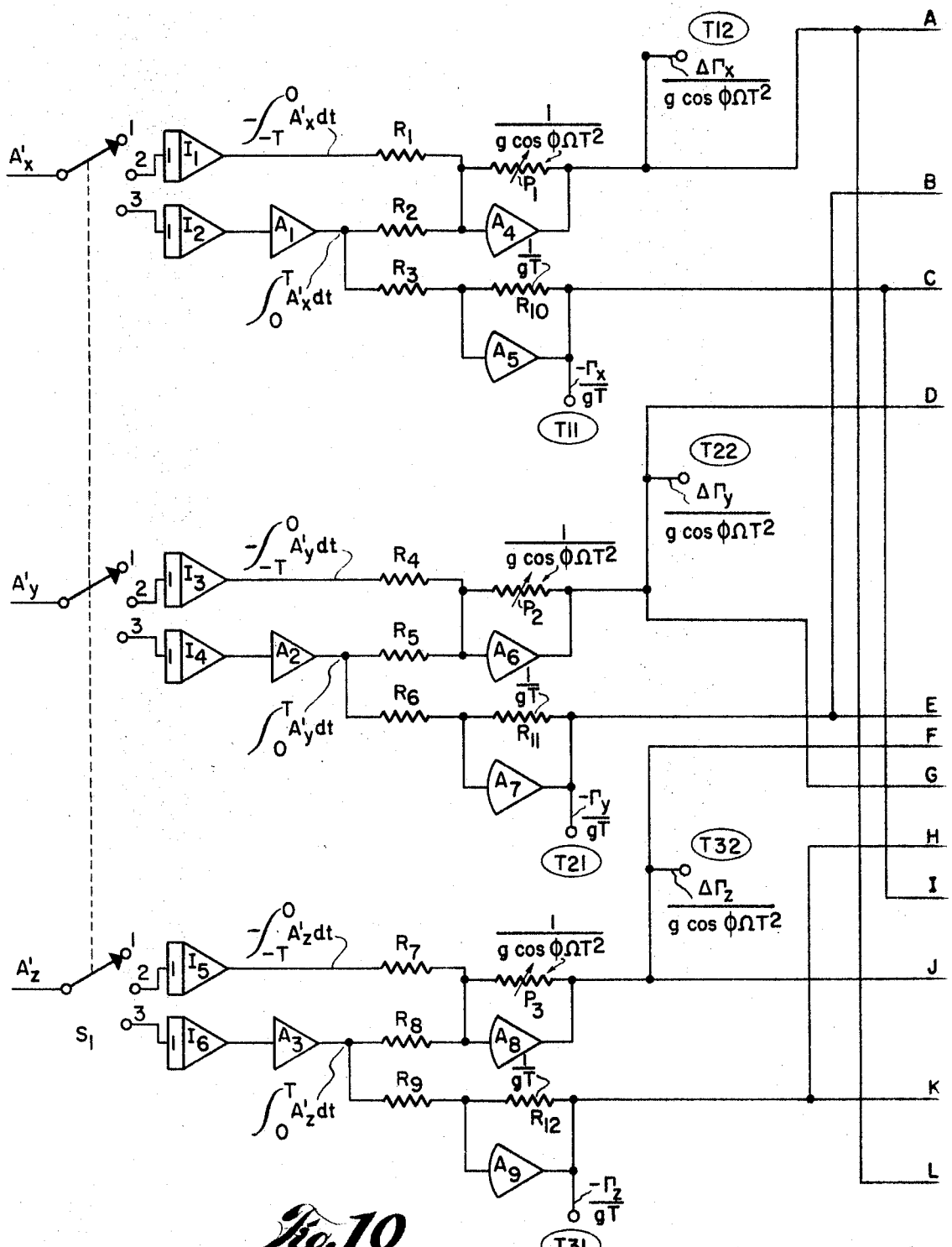
FIG. 10 is a schematic diagram of a 1st portion of the analog computer mechanization for solving the rotation matrix.

FIGS. 10 to 13 indicate the analog mechanization of the transformation equation (Equation 19). Referring to FIG. 10, the inputs to the pointers of switch $S_1$ are $A'_x$, $A'_y$ and $A'_z$, the components of specific force in a nonrotational coordinate frame. Switch $S_1$ will be moved from position 1 to position 2 at some initial time, and kept at position 2 for a fixed time interval T. At the end of the time interval T, switch $S_1$ will be moved to position 3, and maintained there for a second time interval T. By virtue of the above action of switch $S_1$, integrators $I_1$, $I_3$ and $I_5$ are allowed to accumulate the appropriate accelerometer output for the first interval T, and integrators $I_2$, $I_4$ and $I_6$ for the second interval T. The integrators and amplifiers used are of the phase inverting type and well known to those persons skilled in the art.

The output of integrators $I_2$, $I_4$ and $I_6$ are first inverted by phase-inverting amplifiers $A_1$, $A_2$ and $A_3$, respectively, preparatory to being subtracted from the outputs of integrators $I_1$, $I_3$ and $I_5$.

Amplifiers $A_5$, $A_7$ and $A_9$ in conjunction with resistors $R_{10}$, $R_{11}$ and $R_{12}$ produce the first column terms of the $\Gamma$ matrix of Equation (19), giving rise to signals at terminals $T_{11}$, $T_{21}$ and $T_{31}$. Feedback resistors $R_{10}$—$R_{12}$ have a scale value of $1/gT$ and input resistors $R_1$—$R_9$ have a scale value equal to 1. It is understood by those persons skilled in the art that the actual values of all resistors used in this mechanization device will vary with the type of amplifiers, integrators, etc., that are chosen. For a specific treatment of the analog computing art as applied to this device, refer to Analog Methods, 2nd Ed., by Karplus & Soroka, published by McGraw-Hill Book Co., 1959; pages 37—48 and 151—173.

Amplifiers $A_4$, $A_6$ and $A_8$ sum the outputs of integrators $I_1$, $I_3$ and $I_5$ and phase inverting amplifiers $A_1$, $A_2$ and $A_3$, respectively, and produce at their outputs the difference of the successive averages of the accelerometer outputs over the two time intervals T. In addition, amplifiers $A_4$, $A_6$ and $A_8$ scale these differences to produce the second column terms of the $\Gamma$ matrix of Equation (19), giving rise to the signals present on the terminals $T_{12}$, $T_{22}$ and $T_{32}$. The potentiometers $P_1$, $P_2$ and $P_3$ are adjusted to the scale value $1/g \cos\Phi r\, t^2$).

Figure 11:
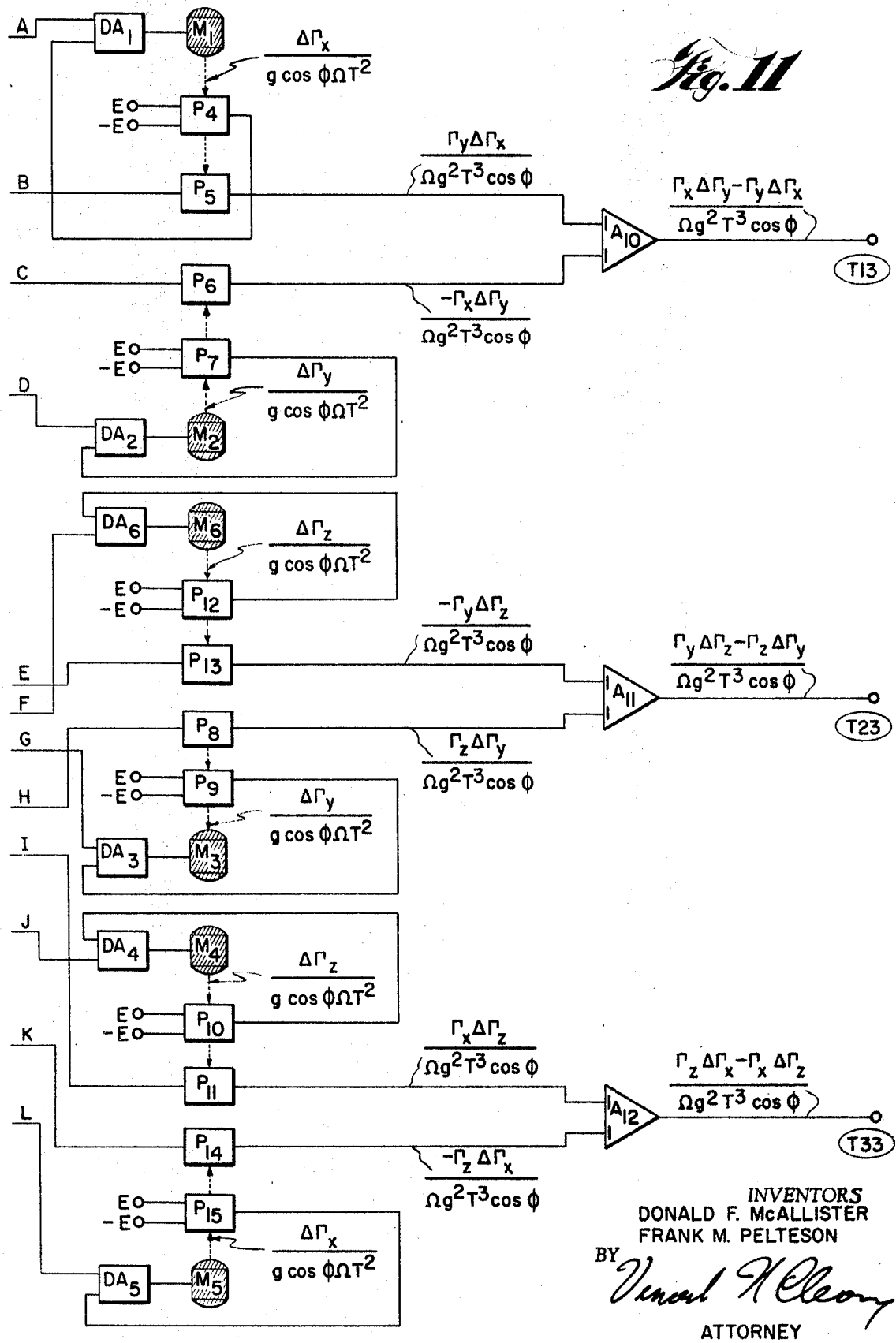
FIG. 11 is a schematic diagram of a 2nd portion of the analog computer mechanization for solving the rotation matrix.

Referring to FIG. 11, connections A, B, C, D, E, F, G, H, I, J, K and L of FIG. 11 correspond to the same connections of FIG. 10. FIG. 11 illustrates the mechanization of the cross-products of the first two column-vectors of the $\Gamma$ matrix of Equation (19).

By means of differential amplifiers $DA_1$—$DA_6$ and motor-driven feedback potentiometers $P_4$, $P_7$, $P_9$, $P_{10}$, $P_{15}$ and $P_{12}$, the signals present on connections A, D, F, G, J and L are used to position motors $M_1$, $M_2$, $M_6$, $M_3$, $M_4$ and $M_5$, respectively.

Taking the combination of connection A, differential amplifier $DA_1$, motor $M_1$, and potentiometer $P_4$ as an example, to describe the operation of the remaining five motor amplifier combinations, it can be seen that the signal present on connection A into the differential amplifier $DA_1$ will be subtracted from any signal present at the output of potentiometer $P_4$. The difference between these two signals will be amplified by $DA_1$ and fed to motor $M_1$. Motor $M_1$ will respond by angularly rotating its shaft which is connected to potentiometers $P_4$ and $P_5$. Potentiometer $P_4$ has for inputs the constant voltage supplies $+E$ and $-E$. As the shaft of motor $M_1$ is rotated, the wiper arm (not shown) of potentiometer $P_4$ picks off a voltage that will vary in magnitude within the range $+E$ and $-E$. When the voltage picked off by potentiometer $P_4$ is equal to the voltage of the signal present on connection A, the output from the differential amplifier $DA_1$ will be zero and the motor $M_1$ will cease to drive the shaft connected to potentiometer $P_4$. The angular position of the motor shaft is proportional to the signal present on connection A; therefore, potentiometer $P_5$ has its wiper arm (not shown) positioned proportional to that signal also. Hence, the motor shaft positions potentiometer $P_5$'s wiper to repeat the terms of the second column of the $\Gamma$ matrix of Equation (19). The required products associated with the cross-products of the first two column vectors of matrix $\Gamma$, Equation (19), are produced by energizing potentiometer $P_5$, $P_6$, $P_{13}$, $P_8$, $P_{11}$ and $P_{14}$ with signals B, C, E, H, I and K, respectively.

Each of the summing amplifiers $A_{10}$, $A_{11}$ and $A_{12}$ sums the output from a pair of potentiometers. Amplifier $A_{10}$ sums the outputs from $P_5$ and $P_6$; amplifier $A_{11}$ sums the outputs from $P_{13}$ and $P_8$; and $A_{12}$ sums the outputs from $P_{14}$ and $P_{11}$. These summing amplifiers at their respective outputs generate the required cross-products of the third column of matrix $\Gamma$, Equation (19), giving rise to the signals present on terminals $T_{13}$, $T_{23}$ and $T_{33}$.

Figure 12:
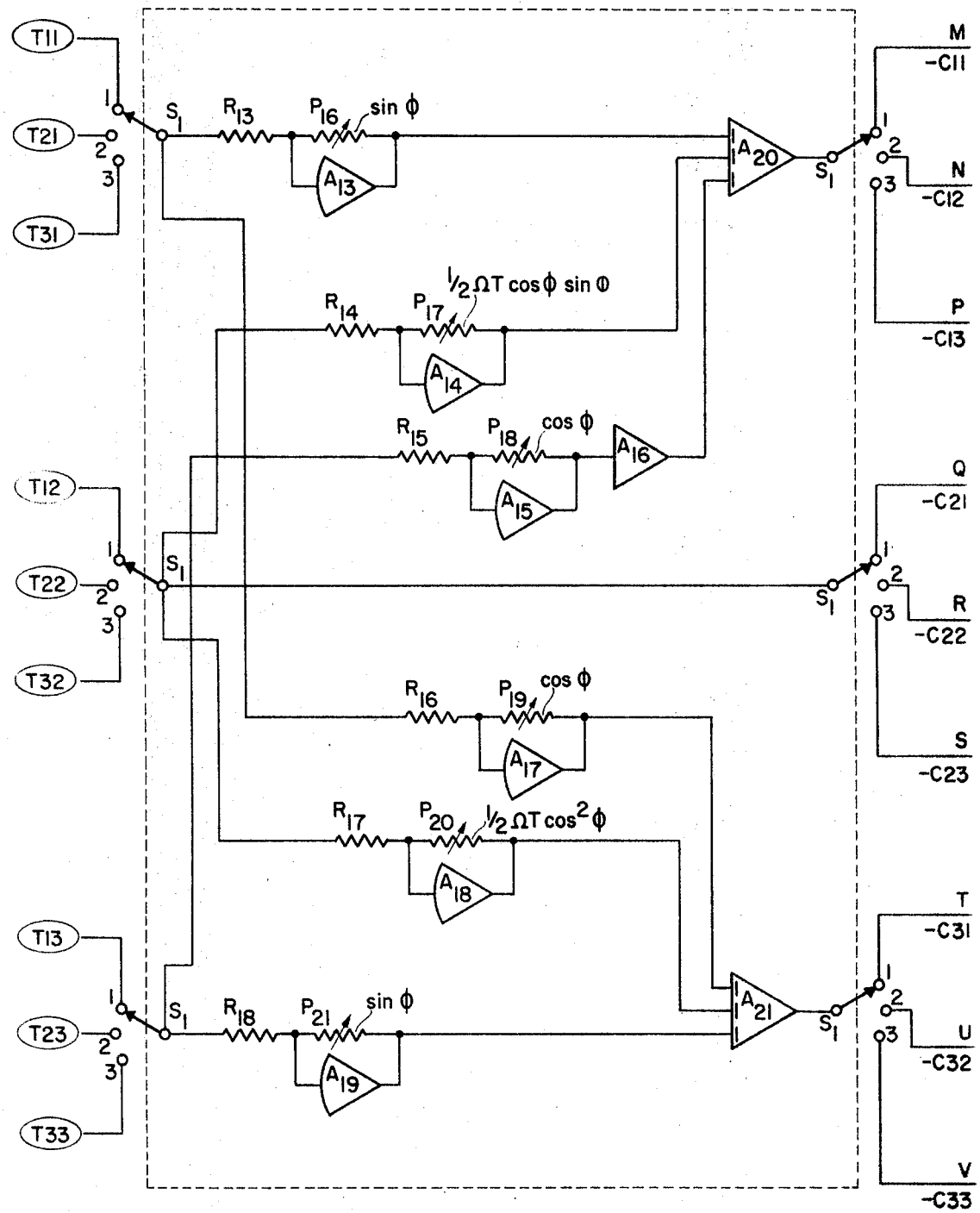
FIG. 12 is a schematic diagram of a 3rd portion of the analog computer mechanization for solving the rotation matrix.

Referring to FIG. 12, in this figure the mechanization for the matrix multiplication of the $\Gamma$ matrix with the $G^{11}$ matrix indicated in Equation (19) is performed.

Signals $T_{11}$, $T_{21}$, $T_{31}$, etc., correspond to the signals of the same nomenclature generated in FIGS. 10 and 11. Because these signals are outputs of the integrators of FIG. 10, they will not change after the second time interval of switching $S_1$ of FIG. 10 to position 3. Hence, the only timing constraint for switch $S_1$ of FIG. 12 is that it dwell at each position long enough for the motor shafts of FIG. 11 to seek a steady state position.

Amplifiers $A_{13}$, $A_{14}$, $A_{15}$, $A_{17}$, $A_{18}$ and $A_{19}$ are sealed by the input resistors $R_{13}$, $R_{14}$, $R_{15}$, $R_{16}$, $R_{17}$, $R_{18}$, and the feedback potentiometers $P_{16}$, $P_{17}$, $P_{18}$, $P_{19}$, $P_{20}$ and $P_{21}$, respectively. These amplifiers perform the required multiplications of the $\Gamma$ matrix by the $G''$ matrix of Equation (19). Amplifier $A_{16}$ provides for an inversion of the output of amplifier $A_{15}$.

With switch $S_1$ in position 1, FIG. 12, row elements 11, 12, and 13 of the I' matrix are matrix multiplied by the first column of the $G''$ matrix. Summing amplifiers $A_{20}$ and $A_{21}$ in conjunction with inverting amplifier $A_{16}$ generate voltages corresponding to elements $C_{11}$, $C_{21}$ and $C_{31}$ of the direction cosine matrix.

Similarly, with switch $S_1$ in position 2, voltages corresponding to elements $C_{21}$, $C_{22}$, and $C_{32}$ are formed; and lastly, with switch $S_1$ in position 3 in FIG. 12, voltages corresponding to elements $C_{31}$, $C_{32}$, and $C_{33}$ are formed.

Figure 13:
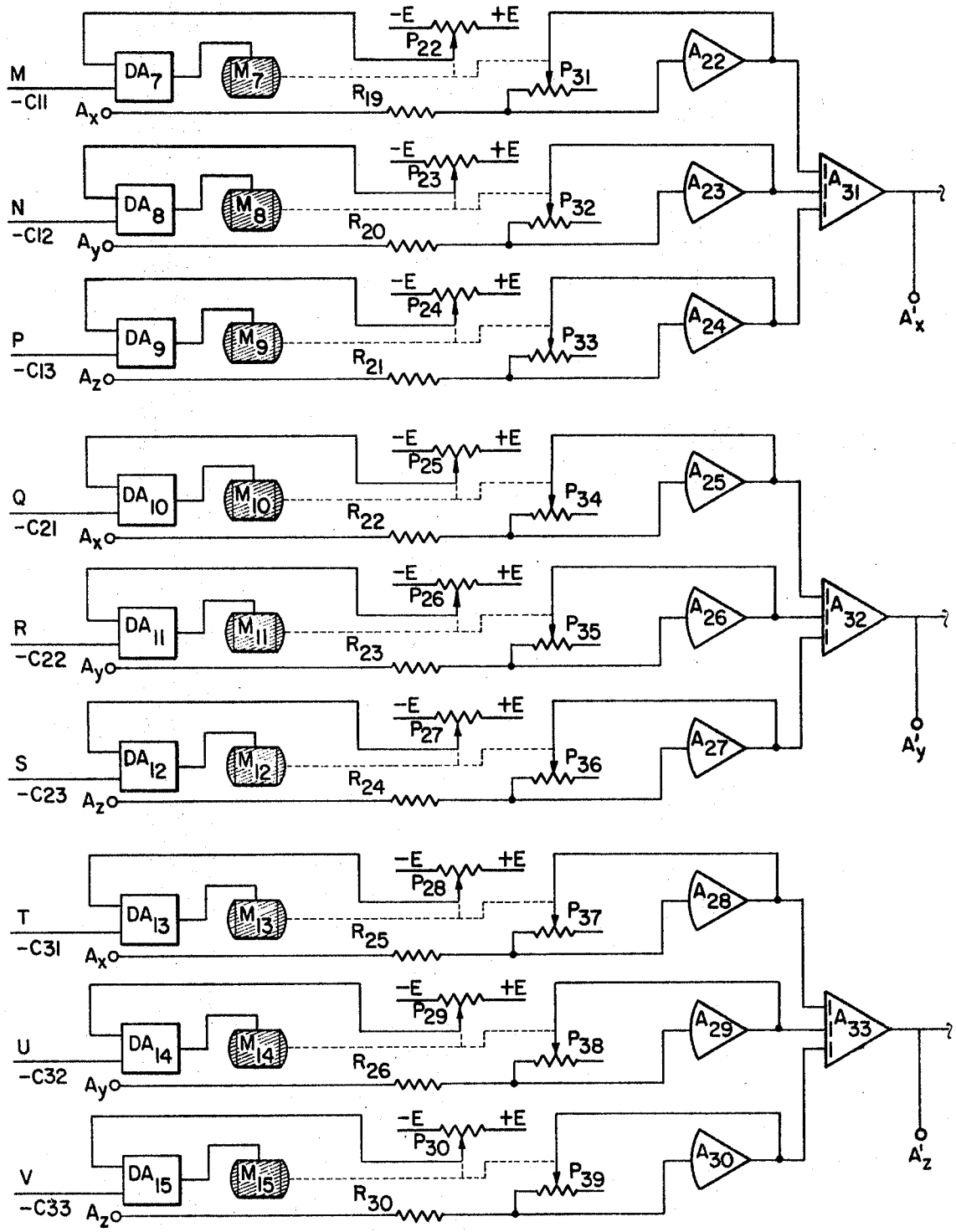
FIG. 13 is a schematic diagram of a final portion of the analog computer mechanization for solving the rotation matrix.

Referring to FIG. 13, connections M, N, P, Q, R, S, T, U and V of FIG. 13 correspond to the same connections of FIG. 12. FIG. 13 illustrates the mechanization for transforming the accelerometer outputs $A_x$, $A_y$ and $A_z$ by multiplying each by three direction cosine voltages to obtain the desired space fixed accelerometer outputs $A'_x$, $A'_y$ and $A'_z$.

The $A_x$ transforming circuit is comprised of differential amplifiers $DA_7$, $DA_8$ and $DA_9$. The inputs to these amplifiers is obtained from connections M, N and P, respectively, and potentiometers $P_{22}$, $P_{23}$ and $P_{24}$, respectively. Each of the potentiometers is connected to a source of $-E$ and $+E$ voltage. The wiper arms of each of these potentiometers is electrically connected to corresponding differential amplifier. The outputs from differential amplifier's $DA_7$—$DA_9$ are connected to motors $M_7$—$M_9$, respectively. The shafts of motors $M_7$—$M_9$ are mechanically connected to the wiper arms of potentiometers $P_{22}$—$P_{24}$, respectively. As previously stated, the position of the motor shafts is controlled by the magnitude of the signal present on the input connections designated M, N and P. The shafts of motors $M_7$—$M_9$ are also mechanically connected to the wipers of potentiometers $P_{31}$—$P_{33}$.

The output signals from accelerometers 38, 40 and 42 are applied to each of the $A_x$, $A_y$ and $A_z$ terminals, respectively, in FIG. 13.

In the $A'_x$ transforming circuit, the $A_x$, $A_y$ and $A_z$ signals are serially fed to amplifiers $A_{22}$, $A_{23}$ and $A_{24}$, respectively, by resistors $R_{19}$, $R_{20}$ and $R_{21}$. The feedback potentiometers $P_{31}$—$P_{33}$ have their wiper arms electrically connected to the output of amplifiers $A_{22}$—$A_{24}$, respectively, to set the gains of these amplifiers.

The angular position of the motor shafts, therefore, sets the gains for each of these amplifiers. The output from each amplifier is then summed by amplifier $A_{31}$ which provides at its output the signal $A'_x$. This signal is then fed back to the corresponding connection in FIG. 10 to close the analog computing loop, and is also available for other uses at the terminal $A'_x$.

The $A'_y$ transforming circuit is comprised of differential amplifiers $DA_{10}$—$DA_{12}$, input connections Q, R and S, motors $M_{10}$—$M_{12}$, potentiometers $P_{25}$—$P_{27}$, feedback potentiometers $P_{34}$—$P_{36}$, input sealing resistors $R_{22}$—$R_{24}$, amplifiers $A_{25}$—$A_{27}$ and the summing amplifier $A_{32}$; the output from amplifier $A_{32}$ is fed back to the $A'_y$ connection in FIG. 10. This circuit is connected and operates in the identical manner as the $A'_x$ circuit.

The $A'_z$ transforming circuit is comprised of differential amplifiers $DA_{13}$—$DA_{15}$, input connectors T, U and V, motors $M_{13}$—$M_{15}$, potentiometers $P_{28}$—$P_{30}$, feedback potentiometers $P_{37}$—$P_{39}$, input sealing resistors $R_{25}$—$R_{27}$, amplifiers $A_{28}$—$A_{30}$, and the summing amplifier $A_{33}$. The output from amplifier $A_{33}$ is fed back to the $A'_z$ connection in FIG. 10. This circuit is connected and operates in the identical manner as the $A'_x$ circuit.

The computed fixed values of the direction cosine matrix are taken from terminals M, N, P, Q, R, S, T, U and V and applied as constant values to a computer. The computer also receives the outputs from the platform mounted accelerometers and performs the following matrix multiplication to give accelerometer outputs in a horizontal earth rotating coordinate system:

Accelerometer outputs in a horizontal earth rotating coordinate system $$= \phi E c b \begin{pmatrix} A_x \\ A_y \\ A_z \end{pmatrix} \quad (34)$$

The mechanization of an analog computer to solve the matrix equations, Equations (19) and (34), is of course only one of many ways that may be utilized to arrive at the same results; for example, a digital computer or an analog computer may be used. Also, as known to persons skilled in the art, there are many various ways to mechanize an analog computer to solve a particular equation. Thus, the method of this invention is adapted to transforming the acceleration signals measured in a first coordinate system into acceleration signals in a second coordinate system.

It is, therefore, applicant's intention to cover all changes and modifications of the example of the invention herein chosen for purposes of the disclosure, which do not constitute departures from the spirit and scope of the invention, the only limitation being the terms of the appended claims.

We claim:

1. A method for converting the outputs from three accelerometers, each aligned to one axis of a Cartesian coordinate system fixed to a freely rotating platform into accelerometer outputs in a horizontal earth rotating coordinate system, comprising the steps of:

determining the constant direction cosine matrix $c$ which transforms a first space-fixed coordinate system to a second space-fixed coordinate system by computing $c$ from the following matrix equation:

$$\begin{pmatrix} 0 \\ 0 \\ g \end{pmatrix} = \phi E c b \begin{pmatrix} A_x \\ A_y \\ A_z \end{pmatrix}$$

in which $$\begin{pmatrix} 0 \\ 0 \\ g \end{pmatrix}$$

is the acceleration matrix known for a horizontal position fixed on the surface of the earth with g being the local gravity acceleration;

$\Phi$ is the matrix which transforms the known horizontal position acceleration matrix to an earth rotating coordinate system;

$E$ is the matrix which transforms the earth rotating coordinate system to a first space fixed coordinate system;

$$\begin{pmatrix} A_x \\ A_y \\ A_z \end{pmatrix}$$

is the accelerometer output matrix in a space rotating, platform fixed coordinate system;

$b$ is the matrix which transforms the platform rotating accelerometer output signals computed in the Cartesian coordinate system into acceleration output signals in said horizontal earth rotating coordinate system, said $b$ matrix transformation determining the acceleration output signals in response to the rotating platform; and releasing said platform to freely rotate from a preferred starting position.

2. Apparatus for calculating the fixed direction cosine matrix for converting first coordinate system accelerometer output signals of a freely rotating platform to accelerometer output signals in a second coordinate system comprising in combination:

means for releasing said platform to freely rotate from a preferred starting position;

means for determining the first coordinate space-fixed accelerometer outputs $A'_x$, $A'_y$ and $A'_z$ from the following matrix:

$$\begin{pmatrix} A'_x \\ A'_y \\ A'_z \end{pmatrix} = c b \begin{pmatrix} A_x \\ A_y \\ A_z \end{pmatrix}$$

where $A_x$, $A_y$, $A_z$ are the space rotating accelerometer outputs and $b$ is the similarity transformation matrix that relates present platform orientation to the past platform orientation at the time of release of said platform;

means for transforming platform rotating accelerometer input signals computed in said first coordinate system into acceleration output signals in said second coordinate system, said means for transforming determining the acceleration output signals in the second coordinate system in response to the platform rotating accelerometer output signals in accordance with the $c^{11}$ matrix computed from the following equation:

$$\begin{pmatrix} c_{11} & c_{21} & c_{31} \\ c_{12} & c_{22} & c_{32} \\ c_{13} & c_{23} & c_{33} \end{pmatrix}$$

$$= \begin{bmatrix} \dfrac{\Gamma X Ia}{g^T}, & -\dfrac{\Delta \Gamma X Ia}{g \cos \phi \Omega T^2}, & \dfrac{\Gamma YIa \Delta \Gamma ZIa - \Gamma YIa \Delta \Gamma ZIa}{g^2 \cos \phi \Omega T^3} \\ \dfrac{\Gamma YIa}{g^T}, & -\dfrac{\Delta \Gamma YIa}{g \cos \phi \Omega T^2}, & \dfrac{\Gamma ZIa \Delta \Gamma XIa - \Gamma XIa \Delta \Gamma ZIa}{g^2 \cos \phi \Omega T^3} \\ \dfrac{\Gamma ZIa}{g^T}, & -\dfrac{\Delta \Gamma ZIa}{g \cos \phi \Omega T^2}, & \dfrac{\Gamma XIa \Delta \Gamma YIa - \Gamma YIa \Delta \Gamma XIa}{g^2 \cos \phi \Omega T^3} \end{bmatrix}$$

$$\begin{pmatrix} \sin \phi & 0 & \cos \phi \\ \dfrac{\Omega T \cos \phi \sin \phi}{2} & 1 & \dfrac{\Omega T \cos \phi}{2} \\ \cos \phi & 0 & -\sin \phi \end{pmatrix}$$

in which the $\Gamma XTa$, $\Gamma YTa$, and $\Gamma ZTa$ are the fixed-time integrals of space-fixed accelerometer outputs $A'_x$, $A'_y$ and $A'_z$, respectively, and the $\Delta\Gamma$'s are the differences of two successively taken fixed-time $\Gamma$ intervals, $\Omega$ is the earth rate, $g$ is the local observed force of gravity, $\Phi$ is the astronomic latitude, $T$ is the fixed-time interval of integration; and means for inverting the $c^{11}$ matrix to determine the fixed direction cosine matrix $c$.

3. Apparatus for converting the outputs from three accelerometers, each aligned to one axis of a Cartesian coordinate system fixed to a freely rotating platform into accelerometer outputs in a horizontal earth rotating coordinate system, comprising in combination:

means for releasing said platform to freely rotate from a preferred starting position;

means for determining the constant direction cosine matrix $c$ by calculating $c$ from the following matrix equation:

$$\begin{pmatrix} 0 \\ 0 \\ g \end{pmatrix} = \phi E c b \begin{pmatrix} A_x \\ A_y \\ A_z \end{pmatrix}$$

in which $$\begin{pmatrix} 0 \\ 0 \\ g \end{pmatrix}$$

is the acceleration matrix known for a horizontal position fixed on the surface of the earth with g being the local gravity acceleration;

$\Phi$ is the matrix which transforms the known horizontal position acceleration matrix to an earth rotating coordinate system;

$E$ is the matrix which transforms the earth rotating coordinate system to a first space fixed coordinate system;

$c$ is the constant direction cosine matrix to be determined which transforms the first space fixed coordinate system to a second space fixed coordinate system;

$$\begin{pmatrix} A_x \\ A_y \\ A_z \end{pmatrix}$$

is the accelerometer output matrix in a space rotating platform fixed coordinate system; and $b$ is the matrix which transforms the platform rotating accelerometer output signals computed in the Cartesian coordinate system into acceleration output signals in said horizontal earth rotating coordinate system, said $b$ matrix transformation determining the acceleration output signals in response to the rotating platform.

4. Apparatus for converting the output signals from three accelerometers mounted on a freely rotating platform into accelerometer output signals in a space-fixed coordinate system, comprising in combination:

means for transforming platform rotating accelerometer input signals in a first coordinate system into acceleration output signals in the second coordinate system, said means for transforming determining the acceleration output signals in the second coordinate system in response to the platform rotating accelerometer output signals in accordance with the relationship:

$$\begin{pmatrix} A'_x \\ A'_y \\ A'_z \end{pmatrix} = cb \begin{pmatrix} A_x \\ A_y \\ A_z \end{pmatrix}$$

where $A'_x$, $A'_y$ and $A'_z$ are the space-fixed accelerometer outputs, $A_x$, $A_y$ and $A_z$ are the platform rotating accelerometer outputs and $b$ is a transforming matrix, and wherein $c^{11}$ is a constant transforming matrix as follows:

$$\begin{pmatrix} c_{11} & c_{21} & c_{31} \\ c_{12} & c_{22} & c_{32} \\ c_{13} & c_{23} & c_{33} \end{pmatrix}$$

$$= \begin{bmatrix} \dfrac{\Gamma X Ia}{g^T}, & -\dfrac{\Delta \Gamma X Ia}{g \cos \phi \Omega T^2}, & \dfrac{\Gamma YIa \Delta \Gamma ZIa - \Gamma YIa \Delta \Gamma ZIa}{g^2 \cos \phi \Omega T^3} \\ \dfrac{\Gamma YIa}{g^T}, & -\dfrac{\Delta \Gamma YIa}{g \cos \phi \Omega T^2}, & \dfrac{\Gamma ZIa \Delta \Gamma XIa - \Gamma XIa \Delta \Gamma ZIa}{g^2 \cos \phi \Omega T^3} \\ \dfrac{\Gamma ZIa}{g^T}, & -\dfrac{\Delta \Gamma ZIa}{g \cos \phi \Omega T^2}, & \dfrac{\Gamma XIa \Delta \Gamma YIa - \Gamma YIa \Delta \Gamma XIa}{g^2 \cos \phi \Omega T^3} \end{bmatrix}$$

$$\begin{bmatrix} \sin \phi & 0 & \cos \phi \\ \dfrac{\Omega T \cos \phi \sin \phi}{2} & 1 & \dfrac{\Omega T \cos \phi}{2} \\ \cos \phi & 0 & -\sin \phi \end{bmatrix}$$

in which the $\Gamma XIa$, $\Gamma YTa$, and $\Gamma ZTa$ are the fixed-time integrals of space-fixed accelerometer outputs $A'_x$, $A'_y$ and $A'_z$, respectively, and the $\Delta\Gamma$'s are the differences of two successively taken fixed-time $\Gamma$ intervals, $\Omega$ is the earth rate, $g$ is the local observed force of gravity, $\Phi$ is the astronomic latitude, $T$ is the fixed-time interval of integration; and means for inverting the $c^{11}$ matrix to determine the fixed direction cosine matrix $c$.

UNITED STATES PATENT OFFICE
CERTIFICATE OF CORRECTION

Patent No. 3,597,598      Dated August 3, 1971

Inventor(s) Donald F. McAllister et al.     PAGE - 1

It is certified that error appears in the above-identified patent and that said Letters Patent are hereby corrected as shown below:

Column 16, line 5, Eq. (17) should read $-- c^{-1} = A\ G^{-1} --$;

Column 16, line 6, "Because $c^{11} = c^t$" should read --Because $c^{-1} = c^t$--;

Column 17, line 16, "A" should be --$\bar{A}$--;

Column 17, line 29, Eq. (22) should read as follows:

$$A_x = \frac{d\Pi_x}{dt}\ ,\ A_y = \frac{d\Pi_y}{dt}\ ,\ A_z = \frac{d\Pi_z}{dt}$$

Column 18, line 26, "vectors g, and A" should read --vectors $\bar{g}$, and $\bar{A}$--;

Column 19, line 1, "g" should be --$\bar{g}$--;

PO-1050
(5/69)

UNITED STATES PATENT OFFICE
CERTIFICATE OF CORRECTION

Patent No. 3,597,598      Dated August 3, 1971

Inventor(s) Donald F. McAllister et al     PAGE - 2

It is certified that error appears in the above-identified patent and that said Letters Patent are hereby corrected as shown below:

IN THE CLAIMS:

Claim 2, Column 23, line 11 - "$c^{11}$" should read --$c^{-1}$--;

Claim 2, Column 23, line 29 - "$\sqrt{X}$Ta, $\sqrt{Y}$Ta, and $\sqrt{Z}$Ta should read --$\sqrt{X}$Ia, $\sqrt{Y}$Ia, and $\sqrt{Z}$Ia--;

Claim 2, Column 23, line 35 - "$c^{11}$" should read --$c^{-1}$--;

Claim 3, Column 24, lines 3-6 should read

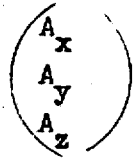

Claim 3, Column 24, line 35 - "$c^{11}$" should read --$c^{-1}$--;

Claim 3, Column 24, line 53 - "$\sqrt{Y}$Ta, and $\sqrt{Z}$Ta" should read --$\sqrt{Y}$Ia, and $\sqrt{Z}$Ia--;

Claim 3, Column 24, line 59 - "$c^{11}$" should read --$c^{-1}$--.

Signed and sealed this 14th day of March 1972.

(SEAL)
Attest:

EDWARD M. FLETCHER, JR.            ROBERT GOTTSCHALK
Attesting Officer                  Commissioner of Patents